United States Patent
Mochizuki et al.

(10) Patent No.: US 10,334,451 B2
(45) Date of Patent: Jun. 25, 2019

(54) COMMUNICATION SYSTEM

(71) Applicant: MITSUBISHI ELECTRIC CORPORATION, Chiyoda-ku (JP)

(72) Inventors: Mitsuru Mochizuki, Tokyo (JP); Miho Maeda, Tokyo (JP); Shinsuke Uga, Tokyo (JP); Noriyuki Fukui, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/842,376

(22) Filed: Dec. 14, 2017

(65) Prior Publication Data

US 2018/0109964 A1 Apr. 19, 2018

Related U.S. Application Data

(63) Continuation of application No. 14/767,501, filed as application No. PCT/JP2014/053291 on Feb. 13, 2014, now Pat. No. 9,955,363.

(30) Foreign Application Priority Data

Feb. 15, 2013 (JP) .................................. 2013-027801

(51) Int. Cl.
H04W 40/00 (2009.01)
H04W 16/32 (2009.01)
(Continued)

(52) U.S. Cl.
CPC ........... *H04W 16/32* (2013.01); *H04W 16/08* (2013.01); *H04W 52/0206* (2013.01);
(Continued)

(58) Field of Classification Search
CPC .. H03W 16/32; H04W 16/08; H04W 52/0206
(Continued)

(56) References Cited

U.S. PATENT DOCUMENTS

2010/0056184 A1* 3/2010 Vakil ....................... H04W 4/02
455/456.5
2010/0159927 A1 6/2010 Toda
(Continued)

FOREIGN PATENT DOCUMENTS

CN 101472317 A 7/2009
CN 101835176 A 9/2010
(Continued)

OTHER PUBLICATIONS

Partial European Search Report dated Feb. 27, 2018 in Patent Application No. 17208344.6 citing references AX-AZ therein, 14 pages.
(Continued)

*Primary Examiner* — Nghi H Ly
(74) *Attorney, Agent, or Firm* — Oblon, McClelland, Maier & Neustadt, L.L.P.

(57) ABSTRACT

A communication system is provided that, if a large number of small cells are installed, is capable of configuring an operation suitable for small cells through simple operation and administration. If a small cell installed in Step ST1401 judges in Step ST1403 that a coverage macro cell, which includes the small cell in the coverage of the coverage macro cell, is present as a result of neighbor cell search in Step ST1402, notifies the coverage macro cell and another neighbor cell of its own capability in Steps ST1404 and 1405. The coverage macro cell selects a configuration parameter suitable for the capability of the small cell in Step ST1406 and notifies the small cell in Step ST1407. The small cell recognizes an operation mode configured by the coverage macro cell from the configuration parameter notified from the coverage macro cell, and then, starts operating in the operation mode.

4 Claims, 25 Drawing Sheets

(51) Int. Cl.
H04W 16/08 (2009.01)
H04W 52/02 (2009.01)
(52) U.S. Cl.
CPC ............... Y02B 70/30 (2013.01); Y02B 70/32 (2013.01); Y02D 70/00 (2018.01); Y02D 70/1224 (2018.01); Y02D 70/1226 (2018.01); Y02D 70/1242 (2018.01); Y02D 70/1244 (2018.01); Y02D 70/1246 (2018.01); Y02D 70/1262 (2018.01); Y02D 70/1264 (2018.01); Y02D 70/24 (2018.01)
(58) Field of Classification Search
USPC ........................... 455/449, 444, 422.1, 426.2
See application file for complete search history.

(56) References Cited

U.S. PATENT DOCUMENTS

| | | | |
|---|---|---|---|
| 2010/0238858 A1* | 9/2010 | Kim | H04W 4/08 370/328 |
| 2010/0261467 A1 | 10/2010 | Chou et al. | |
| 2012/0190359 A1 | 7/2012 | Aminaka et al. | |
| 2012/0264431 A1 | 10/2012 | Lee | |
| 2013/0040625 A1 | 2/2013 | Godin et al. | |
| 2013/0045694 A1 | 2/2013 | Nakamura | |
| 2013/0122913 A1 | 5/2013 | Agarwal et al. | |
| 2013/0235778 A1* | 9/2013 | Maeder | H04W 52/0206 370/311 |

FOREIGN PATENT DOCUMENTS

| | | |
|---|---|---|
| CN | 101854699 A | 10/2010 |
| CN | 101932141 A | 12/2010 |
| CN | 101990197 A | 3/2011 |
| CN | 102884823 A | 1/2013 |
| EP | 2 475 209 A2 | 7/2012 |
| EP | 2 485 517 A1 | 8/2012 |
| JP | 10-145842 | 5/1998 |
| JP | 2005-354549 | 12/2005 |
| JP | 2010-246097 A | 10/2010 |
| JP | 2012-515459 A | 7/2012 |
| JP | 2012-520604 | 9/2012 |
| WO | WO 2011/039925 A1 | 4/2011 |
| WO | WO 2011/085238 A2 | 7/2011 |
| WO | WO 2011/136083 A1 | 11/2011 |
| WO | WO 2012/000551 A1 | 1/2012 |
| WO | WO 2012/079696 A1 | 6/2012 |

OTHER PUBLICATIONS

"Initial consideration on Rel-12 energy saving", Fujitsu, 3GPP Draft, R3-130054, XP050670877, 2013, pp. 1-3.
"Evaluation assumptions for Interference control among small cells", Samsung, 3GPP Draft, R1-130301, XP050663647, 2013, pp. 1-3.
"Summary of off line discussions on clarification of use cases and Requirement for non-overlapping eNB ES", CMCC et al., 3GPP Draft, R3-130394, XP050671199, 2013, pp. 1-3.
Japanese Office Action dated Nov. 14, 2017, issued in Japanese Patent Application No. 2015-500277 (with English translation).
Catt. "The Solution for the Compensation Scenario." 13.3. Discussion and Decision. 3GPP TSG RAN WG3#75bis, San Jose del Cabo, Mexico, Feb. 26-Feb. 30, 2012.
"3rd Generation Partnership Project; Technical Specification Group Radio Access Network; Evolved Universal Terrestrial Radio Access (E-UTRA) and Evolved Universal Terrestrial Radio Access Network (E-UTRAN); Oversall description; Stage 2 (Release 11)", 3GPP TS 36.300 V11.4.0, (Dec. 2012), [207 total pages].
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.0.0, (Jun. 2012), [302 total pages].
"3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.0.0, (Jun. 2012). [33 total pages].
"3rd Generation Partnership Project; Technical Specification Group Services and System Aspects; Architecture aspects of Home NodeB and Home eNodeB (Release 9)", 3GPP TR 23.830 V9.0.0, (Sep. 2009), [55 total pages].
"LS on HNB/HeNB Open Access Mode", 3GPP TSG-SA1 #42, S1-083461, Oct. 2008, [2 total pages].
"LS on CSG cell identification", 3GPP TSG-RAN WG 2 meeting #62, R2-082899, May 2008, [2 total pages].
"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0, (Mar. 2010), [104 total pages].
"3rd Generation Partnership Project; Technical Specification Group Radio Access Network; Feasibility study for Further Advancements for E-UTRA (LTE-Advanced) (Release 10)", 3GPP TR 36.912 V10.0.0, (Mar. 2011), [258 total pages].
"3rd Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.0.0, (Mar. 2012), [316 total pages].
"3rd Generation Partnership Project; Technical Specification Group Radio Access Network; Coordinated multi-point operation for LTE physical layer aspects (Release 11)", 3GPP TR 36.819 V11.1.0 (Dec. 2011), [69 total pages].
"3rd Generation Partnership Project; Technical Specification Group Radio Access Network; Evolved Universal Terrestrial Radio Access (E-UTRA); Base Station (BS) conformance testing (Release 11)", 3GPP TS 36.141 V11.1.0, (Jun. 2012), [224 total pages].
"Requirements, Candidate Solutions & Technology Roadmap for LTE Rel-12 Onward", 3GPP Workshop on Release 12 and onwards, RWS-120010, NTT DOCOMO, Inc., Jun. 2012, [27 total pages].
"Views on Rel-12 and onwards for LTE and UMTS", 3GPP RWS-120006, Jun. 2012, [21 total pages].
"Final Report of 3GPP TSG RAN WG1 #66bis v1.1.0 (Zhuhai, P. R. China, Oct. 10-14, 2011)", MCC Support. 3GPPTSG RAN WG1 Meeting # 67, R1-114352, Nov. 2011, [112 total pages].
"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.3.0, (Dec. 2012), [141 total pages].
"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.2.0, (Dec. 2012), [272 total pages].
International Preliminary Report on Patentability and Written Opinion dated Aug. 27, 2015 in PCT/JP2014/053291 (with English Translation).
3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.1.0 (Sep. 2012). [33 pages].
Extended European Search Report dated Jul. 6, 2016 in Patent Application No. 14751041.6.
3$^{rd}$ Generation Partnership Project; Technical Specification Group Services and System Aspects; Telecommunication management; Study on Energy Savings Management (EMS)(Release 9), 3GPP TR 32.826, V. 2.0.0, (Mar. 2010), pp. 33.
"Consideration on intra-LTE energy saving solutions for small cell" China Unicom, 3GPP TSG RAN WG3 #79, R3-130127, Jan. 28-Feb. 1, 2013, pp. 3.
"Summary of off line discussions on clarification of use cases and Requirement for non-overlapping eNB ES", CMCC et al., 3GPP Draft, R3-130393, XP050671199, 2013; pp. 1-3.

(56) References Cited

OTHER PUBLICATIONS

Japanese Office Action dated Jan. 23, 2018 in Japanese Patent Application No. 2015-500277 (with unedited computer generated English translation), citing document AA therein, 6 pages.
Extended European Search Report dated Jun. 1, 2018 in European Patent Application No. 17208344.6, 13 pages.
Office Action dated Oct. 29, 2018 in Chinese Patent Application No. 201480009033.0, citing documents AO-AT therein, with English-language translation, 20 pages.
Office Action dated Nov. 13, 2018 in Japanese Patent Application No. 2018-080649, citing documents AO and AX-AY therein, with English-language translation, 6 pages.
New Postcom, Mechanisms of Interference Avoidance and Coordination Among Small Cells, 3GPP TSG-RAN WG1 Meeting #72, R1-130190, 3GPP, Jan. 18, 2013, 2 pages.
NTT DOCOMO, Scenario and Candidate Technologies for Small Cell Enhancement, 3GPP TSG-RAN WG1 Meeting #72, R1-130402, 3GPP, Jan. 19, 2013, 9 pages.
Office Action dated Feb. 12, 2019 in Japanese Patent Application No., 2018-080649, with English-language translation, 6 pages.
Office Action dated Apr. 23, 2019 in European Patent Application No., 17 208 344.6, 6 pages. (The references cited therein were previously filed.)

* cited by examiner

F I G . 1
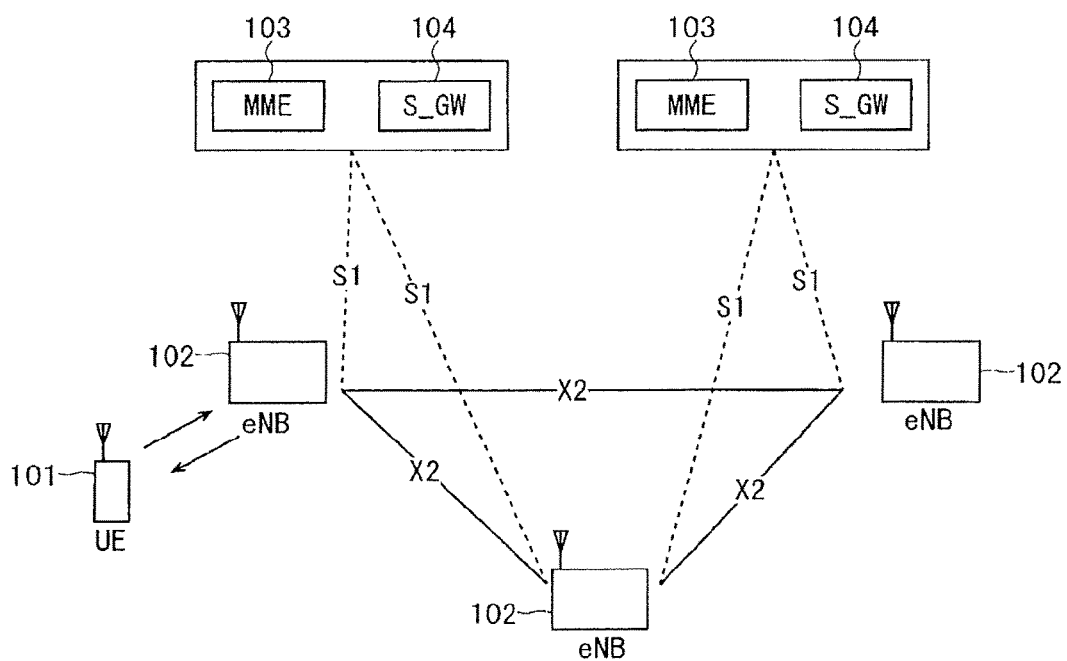

F I G . 2
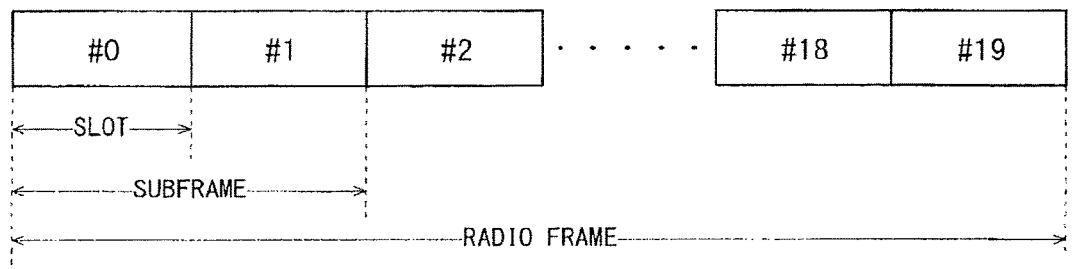

F I G. 4
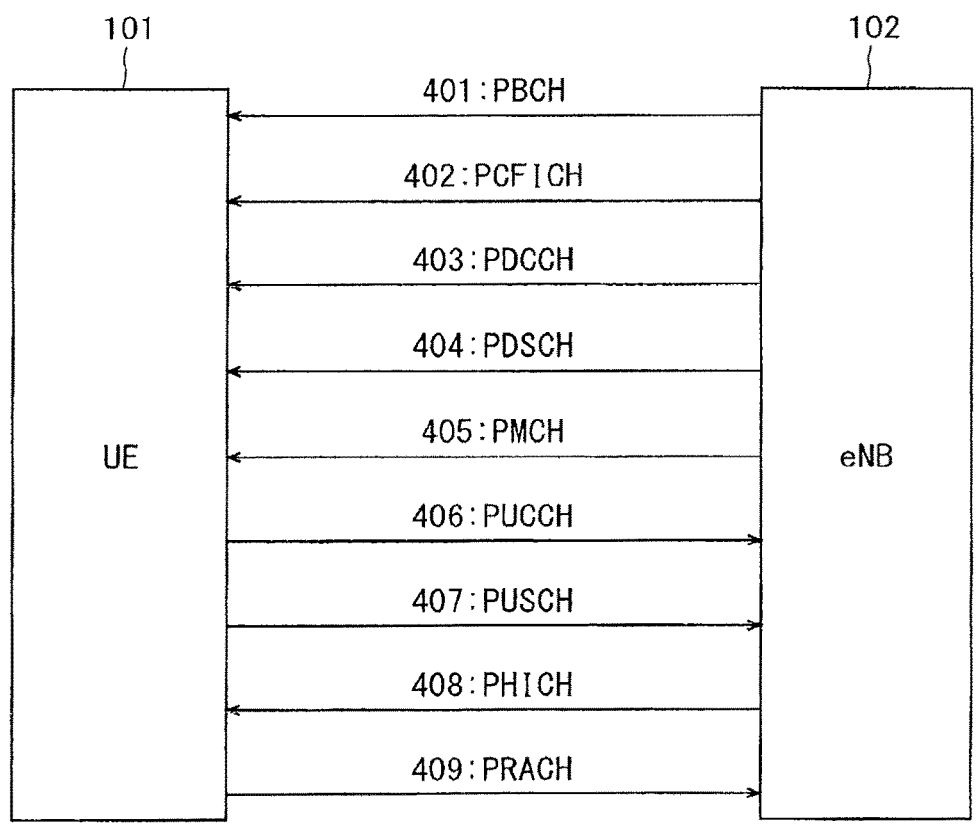

F I G. 5
(A)
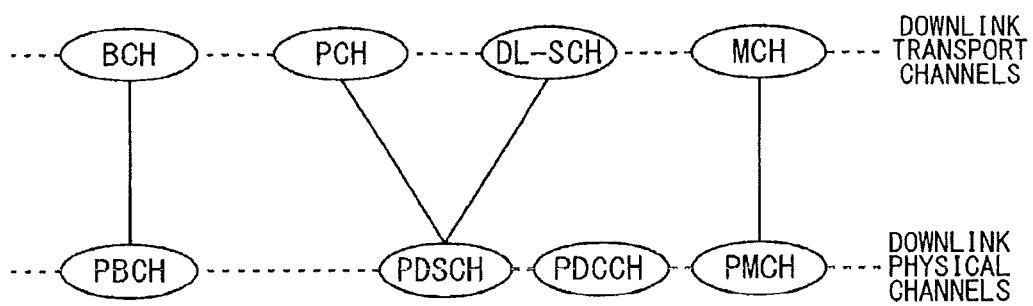
(B)
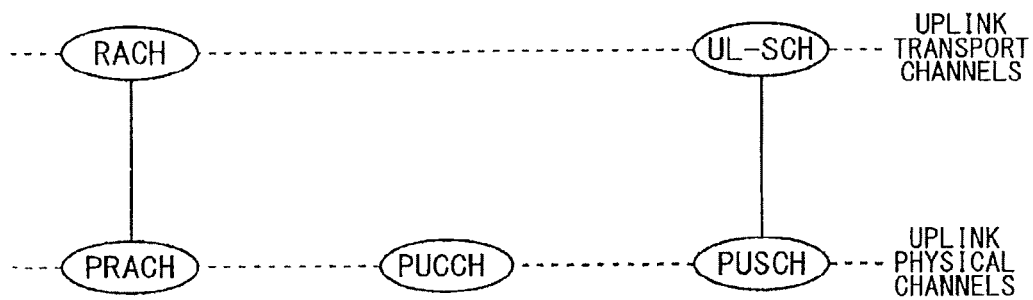

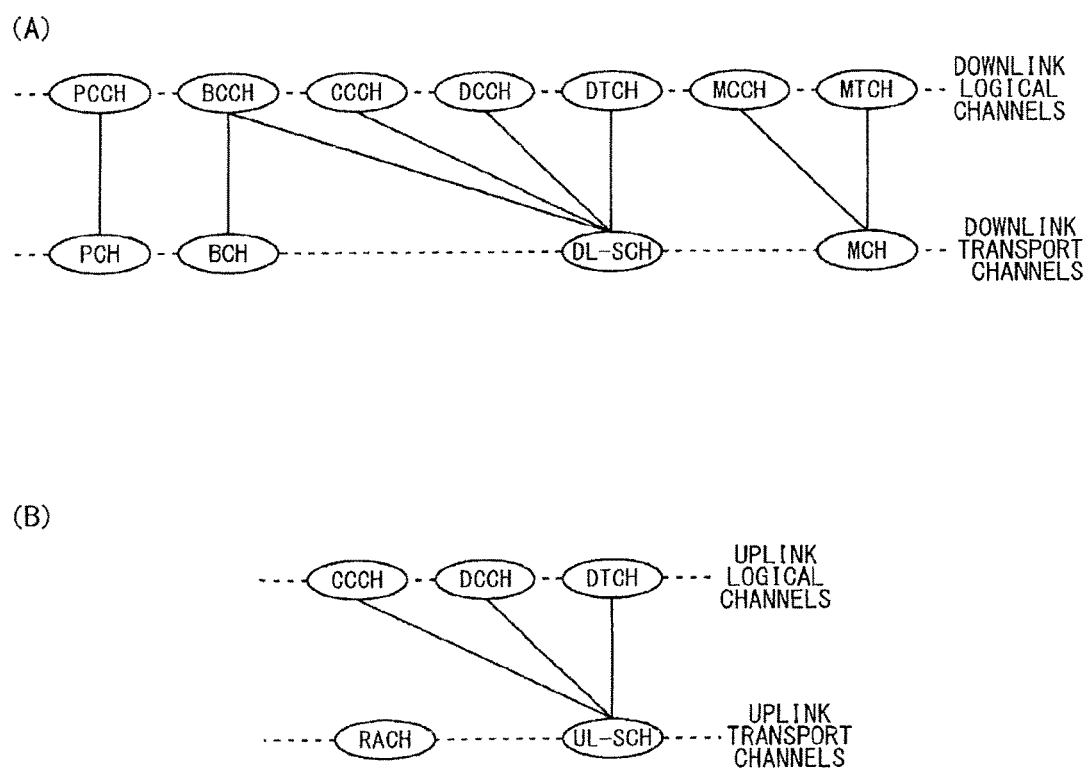
F I G . 6

F I G . 1 0
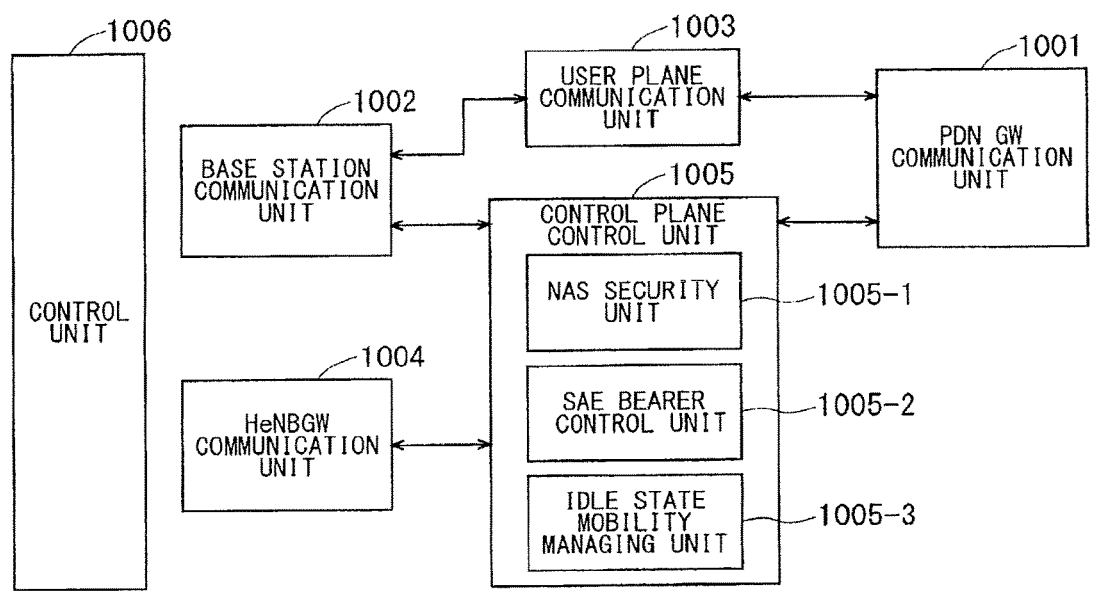

F I G. 1 1
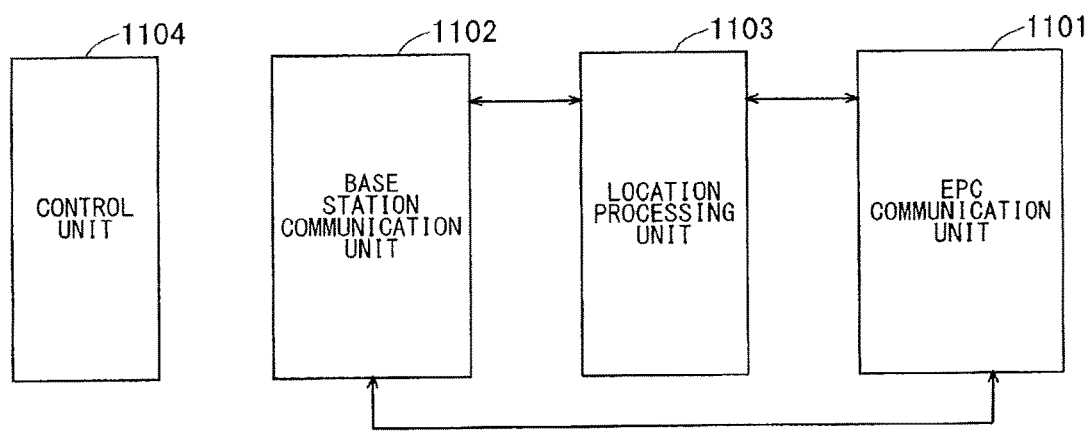

F I G. 1 3
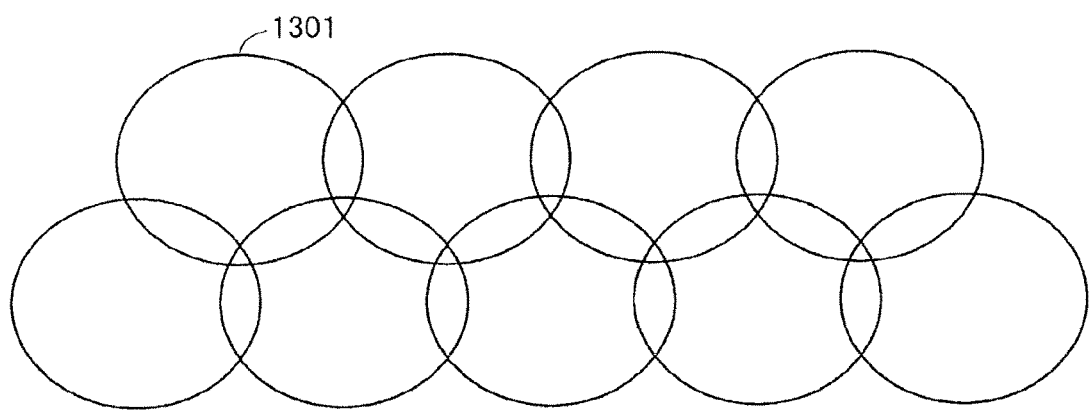

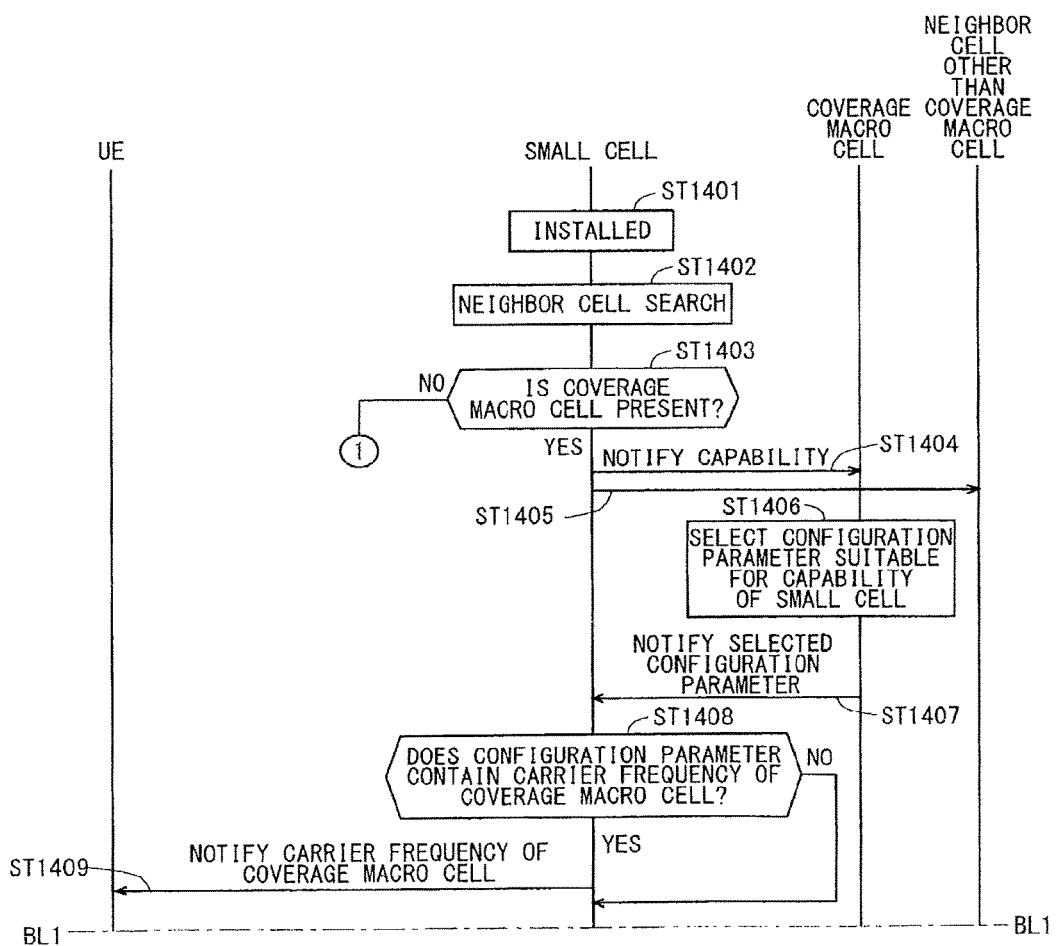

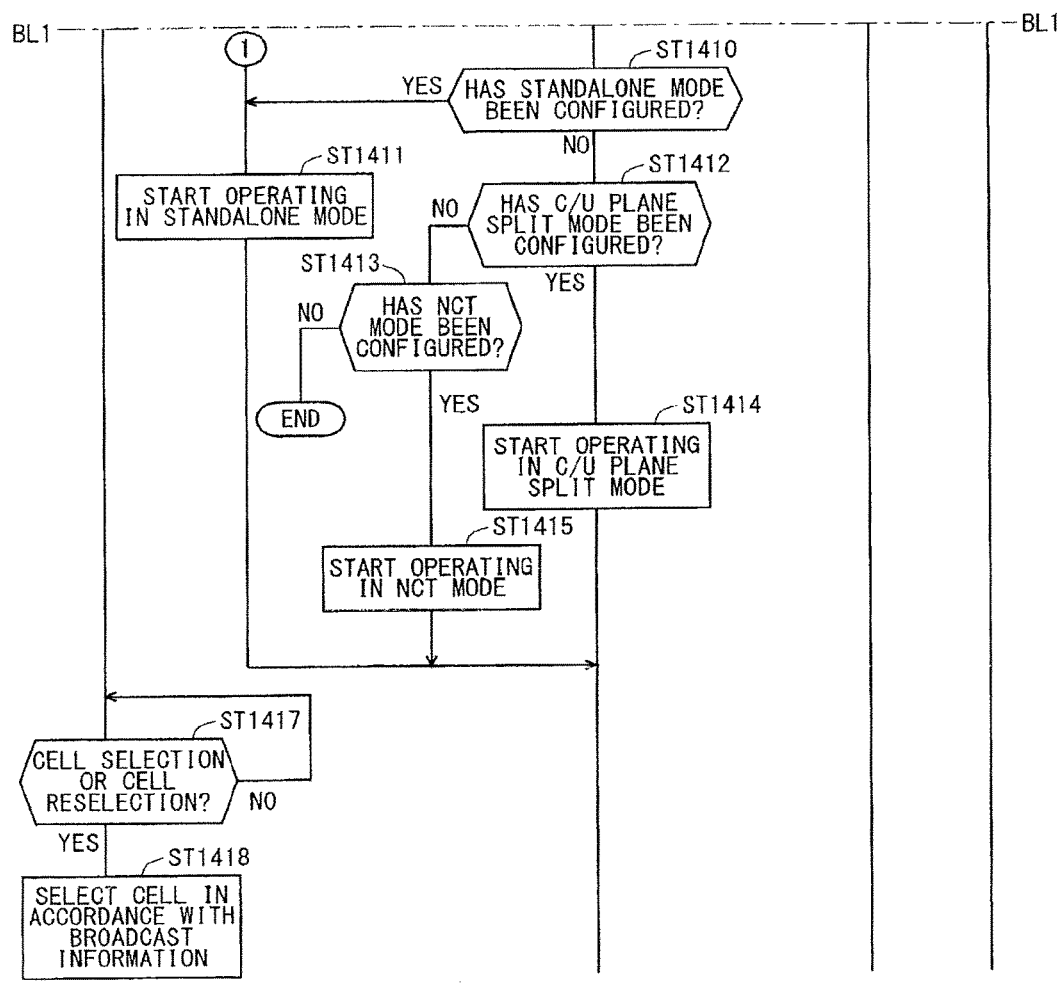
F I G . 1 7

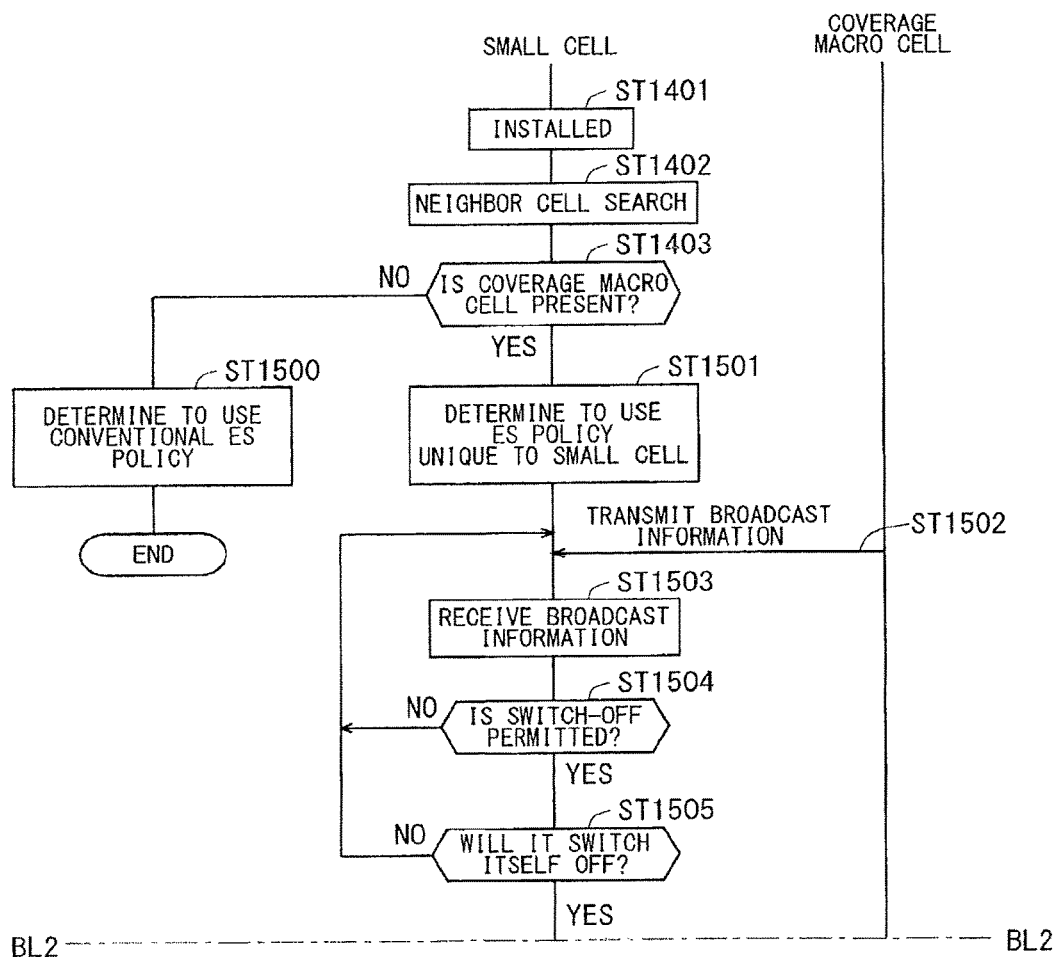

F I G . 2 6
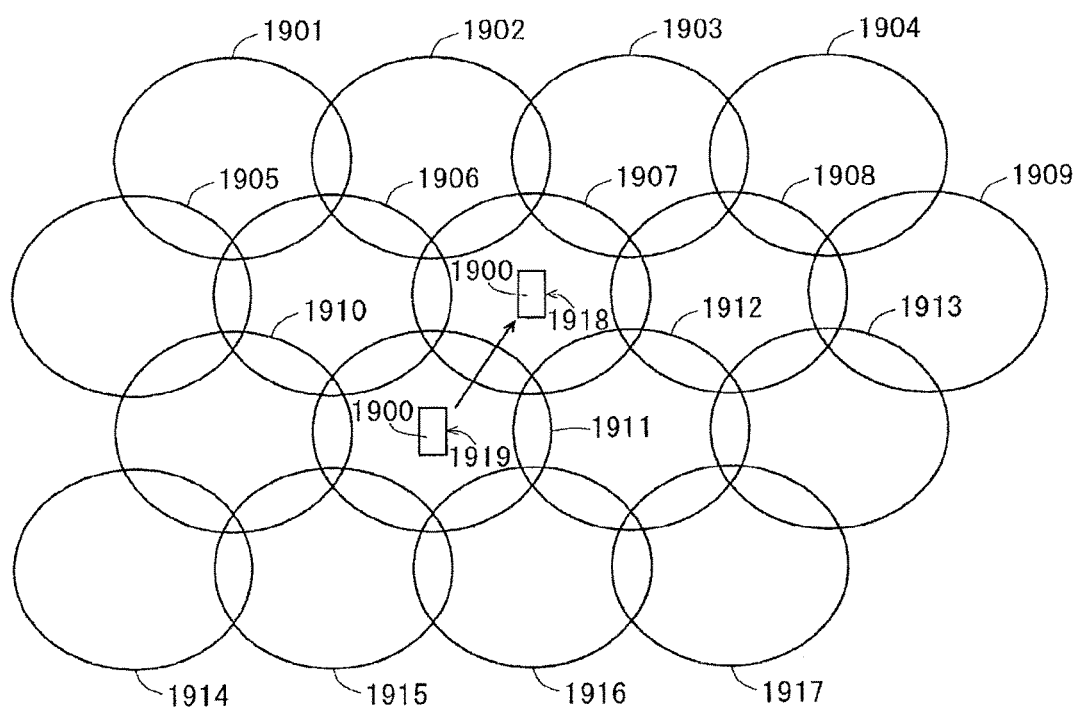

COMMUNICATION SYSTEM

CROSS-REFERENCE TO RELATED APPLICATIONS

The present continuation application is based upon and claims the benefit of priority from U.S. application Ser. No. 14/767,501, filed on Aug. 12, 2015, which is based upon and claims priority from prior International Application No. PCT/JP2014/053291, filed on Feb. 13, 2014, which claims priority from Japanese Patent Application No. 2013-027801 filed on Feb. 15, 2013; the entire contents of which are hereby incorporated by reference into this application.

TECHNICAL FIELD

The present invention relates to a communication system including a network device connected to a core network and a communication terminal device that performs radio communication via the network device.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio sections and system architecture evolution (SAE) regarding the overall system configuration including a core network and a radio access network (hereinafter, collectively referred to as a network as well) as communication systems independent of W-CDMA. This communication system is also referred to as 3.9 generation (3.9 G) system.

In the LTE, an access scheme, a radio channel configuration, and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single carrier frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a core network and a radio access network are referred to as an evolved packet core (EPC) and an evolved universal terrestrial radio access network (E-UTRAN), respectively, in the LTE communication system. Also in the radio access network, the base station that communicates with a mobile terminal (user equipment (UE)) being a communication terminal device is referred to as an E-UTRAN NodeB (eNB). The EPC functions as a radio network controller that exchanges control data and user data with a plurality of base stations. The EPC is also referred to as an access gateway (aGW). The system formed of the EPC and E-UTRAN is referred to as an evolved packet system (EPS).

Unicast service and evolved multimedia broadcast multicast service (E-MBMS service) are provided in the LTE communication system. The E-MBMS service is broadcast multimedia service. The E-MBMS service is merely referred to as IN/IBMS in some cases. Bulk broadcast contents such as news, weather forecast, and mobile broadcast are transmitted to a plurality of user equipments in the E-MBMS service. This is also referred to as point to multipoint service.

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC), or physical layer (PHY) are ended in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (SI) broadcast, paging, cell reselection, mobility, and the like are performed. In RRC_CONNECTED, the user equipment has RRC connection and is capable of transmitting/receiving data to/from a network. In RRC_CONNECTED, for example, handover (HO) and measurement of a neighbor cell are performed.

The current decisions by 3GPP regarding the frame configuration in the LTE system described in Non-Patent Document 1 (Chapter 5) will be described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is the simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as an MBSFN subframe.

Non-Patent Document 2 describes a signaling example when MBSFN subframes are allocated. FIG. 3 is a diagram illustrating the configuration of the MBSFN frame. As shown in FIG. 3, the radio frames including the MBSFN subframes are allocated per radio frame allocation period. The MBSFN subframe is a subframe allocated for the MBSFN in a radio frame defined by the allocation period and the allocation offset (radio frame allocation offset), which serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. With reference to FIG. 3, the leftmost bit defines the MBSFN allocation for the second subframe (#1). The second bit, third bit, fourth bit, fifth bit, and sixth-bit from the left define the MBSFN allocation for the third subframe (#2), fourth subframe (#3), seventh subframe (#6), eighth subframe (#7), and ninth subframe (#8), respectively. The case where the bit indicates "one" represents that a corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for downlink shared channel (DL-SCH) being one of the transport channels shown in FIG. 5 described below, resource allocation information for a paging channel (PCH) being one of the transport channels shown in FIG. 5, and hybrid automatic repeat request (HARQ) information related to DL-SCH. The PDCCH carries an uplink scheduling grant. The PDCCH carries acknowledgement (Ack) negative acknowledgement (Hack) that is a response signal to uplink transmission. The PDCCH is referred to as an L1/L2 control signal as well.

A physical downlink shared channel (PDSCH) 404 is a channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 5 is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signal (DM-RS) being UE-specific reference signals, positioning reference signals (PRS), and channel-state information reference signals (CSI-RS). The physical layer measurement objects of a user equipment include reference signal received power (RSRP).

The transport channels described in Non-Patent Document 1 (Chapter 5) will be described with reference to FIG. 5. FIG. 5 is a diagram illustrating transport channels used in the LTE communication system. Part (A) of FIG. 5 shows mapping between downlink transport channels and downlink physical channels. Part (B) of FIG. 5 shows mapping between uplink transport channels and uplink physical channels.

A broadcast channel (BCH) among the downlink transport channels shown in Part (A) of FIG. 5 is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcasted to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in Part (B) of FIG. 5. The UL-SCH supports dynamic or semi-static resource allocation. The UL-SCH is mapped to the physical uplink shared channel (PUSCH).

A random access channel (RACH) shown in Part (B) of FIG. 5 is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nark" to the transmitter. The transmitter that has received "Nark" retransmits the data. If the receiver successfully decodes the received data, in other words, if a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. Chase combining is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

The logical channels described in Non-Patent Document 1 (Chapter 6) will be described with reference to FIG. 6. FIG. 6 is a diagram illustrating logical channels used in an LTE communication system. Part (A) of FIG. 6 shows mapping between downlink logical channels and downlink transport channels. Part (B) of FIG. 6 shows mapping between uplink logical channels and uplink transport channels.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UNITS) described below. The CSG cell will be described below (see Chapter 3.1 of Non-Patent Document 3).

The closed subscriber group (CSG) cell is a cell in which subscribers who are allowed to use are specified by an operator (also referred to as a "cell for specific subscribers"). The specified subscribers are allowed to access one or more cells of a public land mobile network (PLMN). One or more cells in which the specified subscribers are allowed access are referred to as "CSG cell(s)." Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked on the basis of an area composed of one or more cells. The locations are tracked for enabling tracking the locations of user equipments and calling user equipments, in other words, incoming calling to user equipments even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whitelist or an allowed CSG list as well. As to the access of user equipments through a CSG cell, the MME performs access control (see Chapter 4.3.1.2 of Non-Patent Document 4). Specific examples of the access of user equipments include attach, combined attach, detach, service request, and a tracking area update procedure (see Chapter 4.3.1.2 of Non-Patent Document 4).

Described below is the service types of a user equipment in an idle state (see Chapter 4.3 of Non-Patent Document 3). The service types of user equipments in an idle state include a limited service, normal service, and operator service. The limited service includes emergency calls, earthquake and tsunami warning system (ETWS), and commercial mobile alert system (CMAS) on an acceptable cell described below. The normal service is a public service on a suitable cell described below. The operator service includes a service for operators only on a reserved cell described below.

Described below is a "suitable cell". The "suitable cell" is a cell on which a UE may camp (Camp ON) to obtain normal service. Such a cell shall fulfill the following conditions (1) and (2).

(1) The cell is part of the selected PLMN or the registered PLMN, or part of the PLMN of an "equivalent PLMN list."

(2) According to the latest information provided by a non-access stratum (NAS), the cell shall further fulfill the following conditions (a) to (d):

(a) the cell is not a barred cell;

(b) the cell is part of a tracking area, not part of the list of "forbidden LAs for roaming," where the cell needs to fulfill (1) above;

(c) the cell shall fulfill the cell selection criteria; and (d) for a cell specified as CSG cell by system information (SI), the CSG-ID is part of a "CSG whitelist" of the UE, that is, is contained in the CSG whitelist of the UE.

Described below is an "acceptable cell." The "acceptable cell" is the cell on which a UE may camp to obtain limited service. Such a cell shall fulfill all the following requirements (1) and (2).

(1) The cell is not a prohibited cell (also referred to as a "barred cell").

(2) The cell fulfills the cell selection criteria.

"Barred cell" is indicated in the system information. "Reserved cell" is indicated in the system information.

"Camping on a cell" represents the state where a UE has completed the cell selection or cell reselection process and the UE has selected a cell for monitoring the system information and paging information. The cell on which the UE camps may be referred to as a "serving cell."

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 5 discloses three different modes of the access to the HeNB and HNB. Specifically, an open access mode, a closed access mode, and a hybrid access mode are disclosed.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. To be served by a base station means to take the base station as a serving cell.

Non-Patent Document 6 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 7 and 8).

As to the LTE-A system, it is studied that a relay and a relay node (RN) are supported for achieving a high data rate, high cell-edge throughput, new coverage area, and the like. The relay node being a relay device is wirelessly connected to the radio-access network via a cell referred to as a donor cell (hereinafter, also referred to as a "Donor eNB; DeNB"). The network (NW)-to-relay node link shares the same frequency band with the network-to-UE link within the range of the donor cell. In this case, the UE supporting Release 8 of 3GPP is also connectable to the donor cell. The link between the donor cell and the relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency band, and a link from an RN to a DeNB and a link from a UE to an RN are also time-division multiplexed at one frequency band. In a relay, accordingly, the transmission of the relay is prevented from interfering the reception of its own relay.

Not only a normal eNB (macro cell) but also so-called local nodes such as pico eNB (pico cell), HeNB (HNB, CSG cell), node for hotzone cells, relay node, remote radio head (RRH), and repeater are studied in 3GPP. The network composed of various types of cells as described above is also referred to as a heterogeneous network (HetNet) in some cases.

The frequency bands (hereinafter, also referred to as "operating bands") usable for communication have been predetermined in the LTE. Non-Patent Document 9 describes the frequency bands.

Carrier aggregation (CA) is studied in the LTE-A system, in which two or more component carriers (CCs) are aggregated to support wider transmission bandwidths up to 100 MHz.

A UE supporting Release 8 or 9 of 3GPP, which supports LTE, is capable of transmission and reception on only one CC corresponding to one serving cell. Meanwhile, it is conceivable that a UE supporting Release 10 of 3GPP may have the capability of transmission and reception, only reception, or only transmission on a plurality of CCs corresponding to a plurality of serving cells at the same time.

Each CC employs the configuration of Release 8 or 9 of 3GPP, and the CA supports contiguous CCs, non-contiguous CCs, and CCs in different frequency bandwidths. The UE cannot configure uplink CCs (UL CCs) equal to or more than the number of downlink CCs (DL CCs). The CCs configured by the same eNB do not need to provide the same coverage. The CC is compatible with Release 8 or 9 of 3GPP.

In CA, an independent HARQ entity is provided per serving cell in uplink as well as downlink. A transport block is generated per TTI for each serving cell. Each transport block and HARQ retransmission are mapped to a single serving cell.

In the case where CA is configured, a UE has a single RRC connection with a NW. In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCell is configured for one UE.

The above-mentioned LTE Advanced (LTE-A) is studied as a further advanced communication system regarding radio sections in 3GPP (see Non-Patent Documents 7 and 8). The LTE-A is based on the LTE communication system regarding radio sections and is configured by addition of several new techniques thereto. The new techniques include the technique of supporting wider bands (wider bandwidth extension) and the coordinated multiple point transmission and reception (CoMP) technique. The CoMP studied for LTE-A in 3GPP is described in Non-Patent Document 10.

CoMP is the technique of expanding the coverage of high data rates, improving a cell-edge throughput, and increasing a communication system throughput by transmission or reception coordinated among multiple geographically separated points. The CoMPs are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) (hereinafter, also referred to as "CS/CB") are studied as the DL CoMP method.

For JP, data is available at each point in a CoMP cooperating set. JPs are grouped into Joint transmission (JT) and dynamic point selection (DPS). DPSs include dynamic cell selection (DCS). In JT, the PDSCH is transmitted from multiple points, specifically, part of or entire CoMP cooperating set, at a time. In DPS, the PDSCH is transmitted from one point in the CoMP cooperating set at a time.

In CS/CB, data is only available in transmission from a serving cell. In CS/CB, user scheduling or beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node (RN), and the like are studied as the units and cells that perform transmission and reception at multiple points. The unit and cell that perform coordinated multiple point transmission are also referred to as a multi-point unit and a multi-point cell, respectively.

3GPP is pursuing specifications standard of Release 12, where the use of small eNBs (cells) is studied to satisfy a tremendous volume of traffic in the future. Examples of the study include the technique of increasing spectral efficiency through installation of a large number of small eNBs (cells) to increase communication capacity.

PRIOR ART DOCUMENTS

Non-Patent Documents

Non-Patent Document 1: 3GPP TS 36.300 V11.4.0
Non-Patent Document 2: 3GPP TS 36.331 V11.0.0
Non-Patent Document 3: 3GPP TS 36.304 V11.1.0, Chapter 3.1, Chapter 4.3, Chapter 5.2.4
Non-Patent Document 4: 3GPP TR 23.830 V9.0.0
Non-Patent Document 5: 3GPP S1-083461
Non-Patent Document 6: 3GPP R2-082899
Non-Patent Document 7: 3GPP TR 36.814 V9.0.0
Non-Patent Document 8: 3GPP TR 36.912 V10.0.0
Non-Patent Document 9: 3GPP TS 36.101 V11.0.0
Non-Patent Document 10: 3GPP TR 36.819 V11.1.0

SUMMARY OF INVENTION

Problem to be Solved by the Invention

As the places in which small cells are installed, the following are studied: a place within the coverage (hereinafter, also referred to as the "coverage of a macro cell") of a macro eNB (hereinafter, also referred to as a "macro cell") and a place outside the coverage of a macro cell. Installation of a large number of small cells is also studied.

Conventional operation and administration of each small cell by an operator, in which the cell's installation place or the like is taken into account, results in complicated work for the operator.

The present invention has an object to provide a communication system capable of configuring, if a large number of small cells are installed, an operation suitable for the small cells through simple operation and administration.

Means to Solve the Problem

A communication system according to the present invention includes a network device that is connected to a core network and a communication terminal device that performs radio communication via the network device. The network device includes a plurality of base station devices each having a range predetermined as a coverage in which communication with the communication terminal device is enabled and configuring a cell that performs radio communication with the communication terminal device in the coverage, and a higher-level device located on the core network side relative to the base station device. The plurality of base station devices include a large-scale base station device configuring a macro cell being a cell having a relatively-wide-range coverage as the coverage, and a small-scale base station device configuring a small cell being a cell having a relatively-narrow-range coverage as the coverage. The small cell notifies the network device including at least one of another cell and the higher-level device of capability information indicating a capability of the small cell. The network device notified of the capability information performs, on the small cell, a configuration suitable for the capability of the small cell on the basis of the notified capability information.

Effects of the Invention

According to the communication system of the present invention, the network device performs a configuration suitable for the capability of the small cell, thereby allowing, when a small cell is installed, the small cell to start operating without an operator. This achieves easy operation and administration by the operator when the small cell is installed. Therefore, if a large number of small cells are installed, a communication system capable of configuring an operation suitable for the small cells is achieved through simple operation and administration.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 10 is a block diagram showing the configuration of an MME unit 73 of FIG. 7 being an MME according to the present invention.

FIG. 11 is a block diagram showing the configuration of a HeNBGW 74 of FIG. 7 being a HeNBGW according to the present invention.

FIG. 13 shows the concept of the configuration of conventional cells.

FIG. 16 shows an example sequence of a communication system in a first embodiment.

FIG. 17 shows the example sequence of the communication system in the first embodiment.

FIG. 18 shows an example sequence of a communication system in a second embodiment.

FIG. 26 is a diagram for explaining the concept of a solution of a third modification of the second embodiment.

DESCRIPTION OF EMBODIMENTS

First Embodiment

Figure 3:
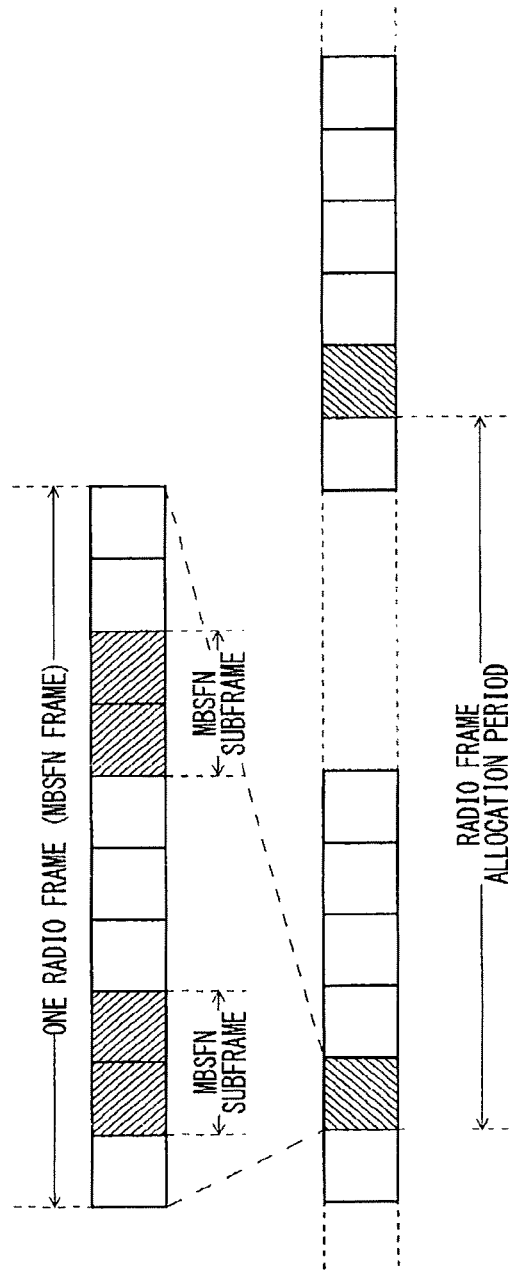
FIG. 3 is a diagram illustrating the configuration of an MBSFN frame.
Figure 7:
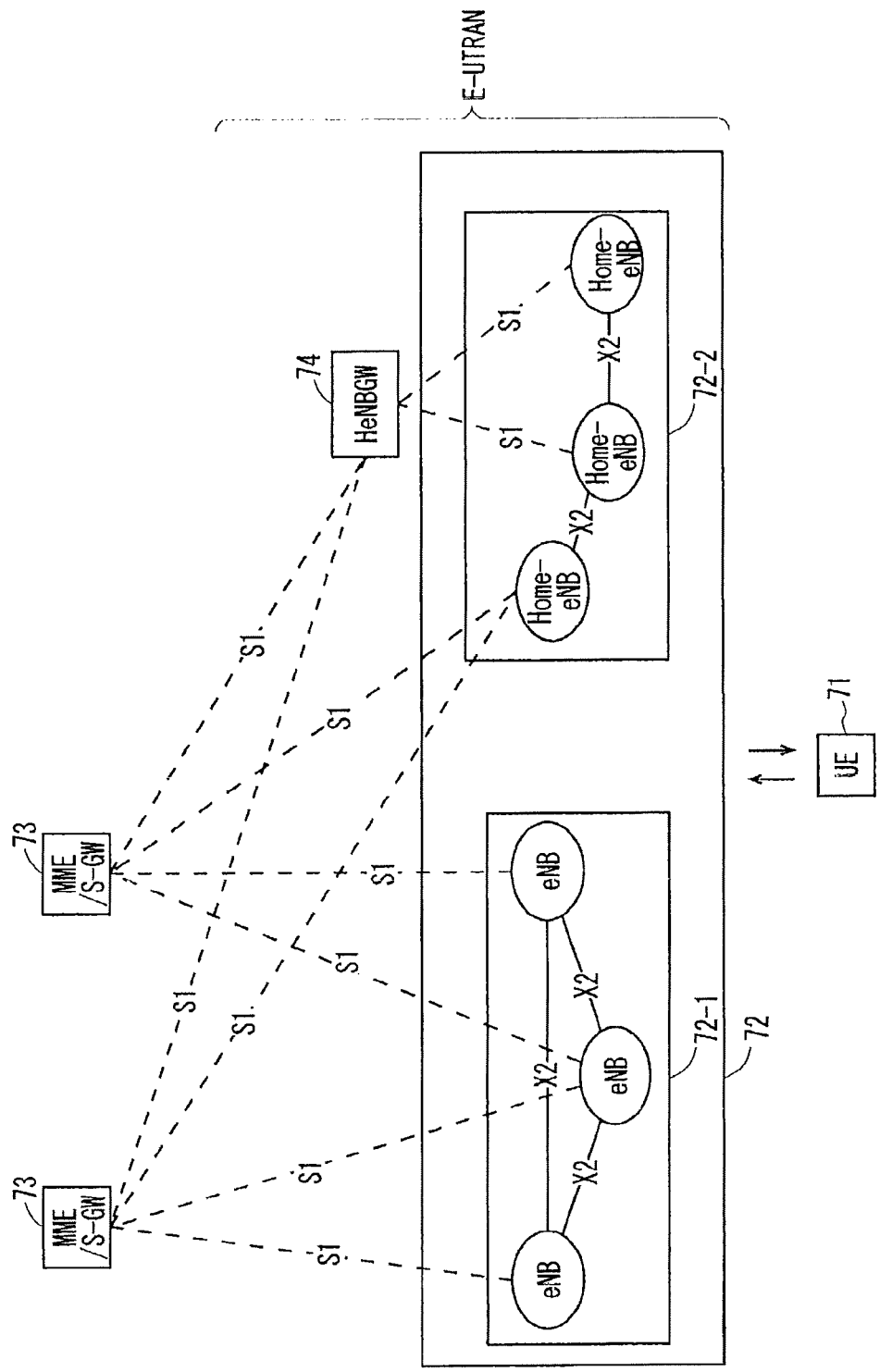
FIG. 7 is a block diagram showing the overall configuration of an LTE communication system currently under discussion of 3GPP.

FIG. 7 is a block diagram showing an overall configuration of an LTE communication system, which is currently under discussion of 3GPP. 3GPP has studied an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, has proposed the configuration as shown in FIG. 7 (see Chapter 4.6.1 of Non-Patent Document 1).

FIG. 7 will be described. A mobile terminal device (hereinafter, referred to as a "user equipment (UE)") 71 being a communication terminal device is capable of radio communication with a base station device (hereinafter, referred to as a "base station") 72 and transmits and receives signals through radio communication. The base stations 72 are classified into eNBs 72-1 and Home-eNBs 72-2.

The eNB 72-1 is connected to an MME/S-GW unit (hereinafter, also referred to as an "MME unit") 73 including an MME, an S-GW, or an MME and an S-GW by means of an S1 interface, and control information is communicated between the eNB 72-1 and the MME unit 73. A plurality of MME units 73 may be connected to one eNB 72-1. The MME unit 73 is included in an EPC being a core network.

The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB gateway (HeNBGW) 74. The Home-eNB 72-2 is connected to the HeNBGW 74 by means of an S1 interface, and the HeNBGW 74 is connected to the MME unit 73 through an S1 interface.

One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are devices of higher nodes and control the connections between the user equipment (UE) 71 and the eNB 72-1 and Home-eNB 72-2 being base stations. The MME units 73 and HeNBGW 74 are included in the EPC being a core network.

Further, 3GPP has studied the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MME unit 73 through the HeNBGW 74 and it is directly connected to the MME unit 73. The HeNBGW 74 does not support the mobility to the Home-eNB 72-2 or the mobility from the Home-eNB 72-2 that spans a plurality of MME units 73. The Home-eNB 72-2 configures a single cell.

The base station device configures a single cell, such as the Home-eNB 72-2, which is not limited thereto. One base station device may support a plurality of cells. The cell has a range predetermined as a coverage in which the cell can communicate with a communication terminal device and performs radio communication with the communication terminal device within the coverage. In the case where one base station device configures a plurality of cells, every cell is configured to communicate with a mobile terminal.

Figure 8:
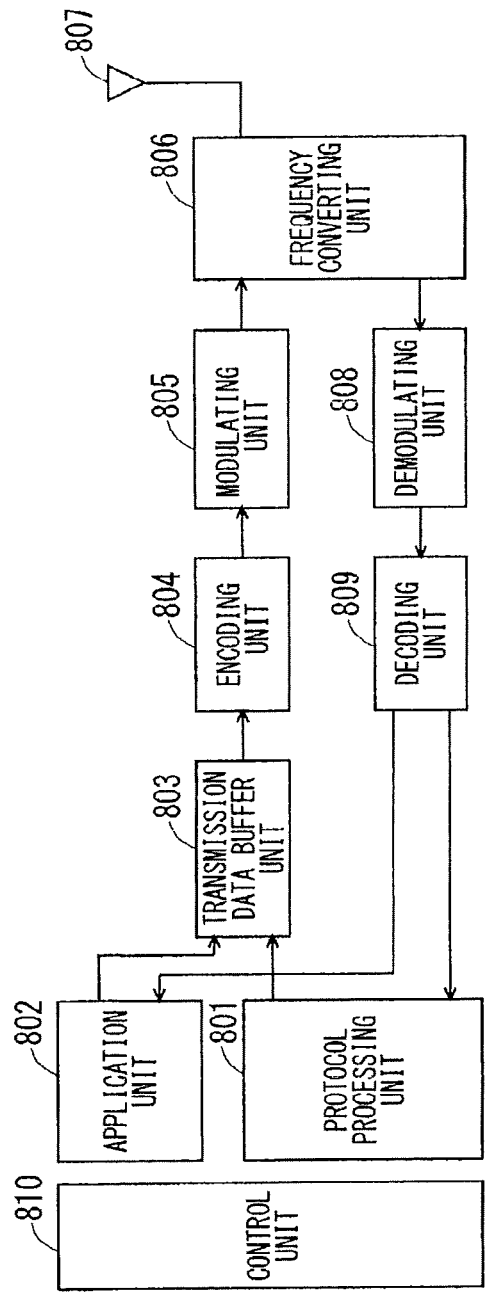
FIG. 8 is a block diagram showing the configuration of a user equipment 71 of FIG. 7 being a user equipment according to the present invention.

FIG. 8 is a block diagram showing the configuration of the user equipment 71 of FIG. 7 being a user equipment according to the present invention. The transmission process of the user equipment 71 shown in FIG. 8 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception process as follows. The radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not shown in FIG. 8, the control unit 810 is connected to the respective units 801 to 809.

Figure 9:
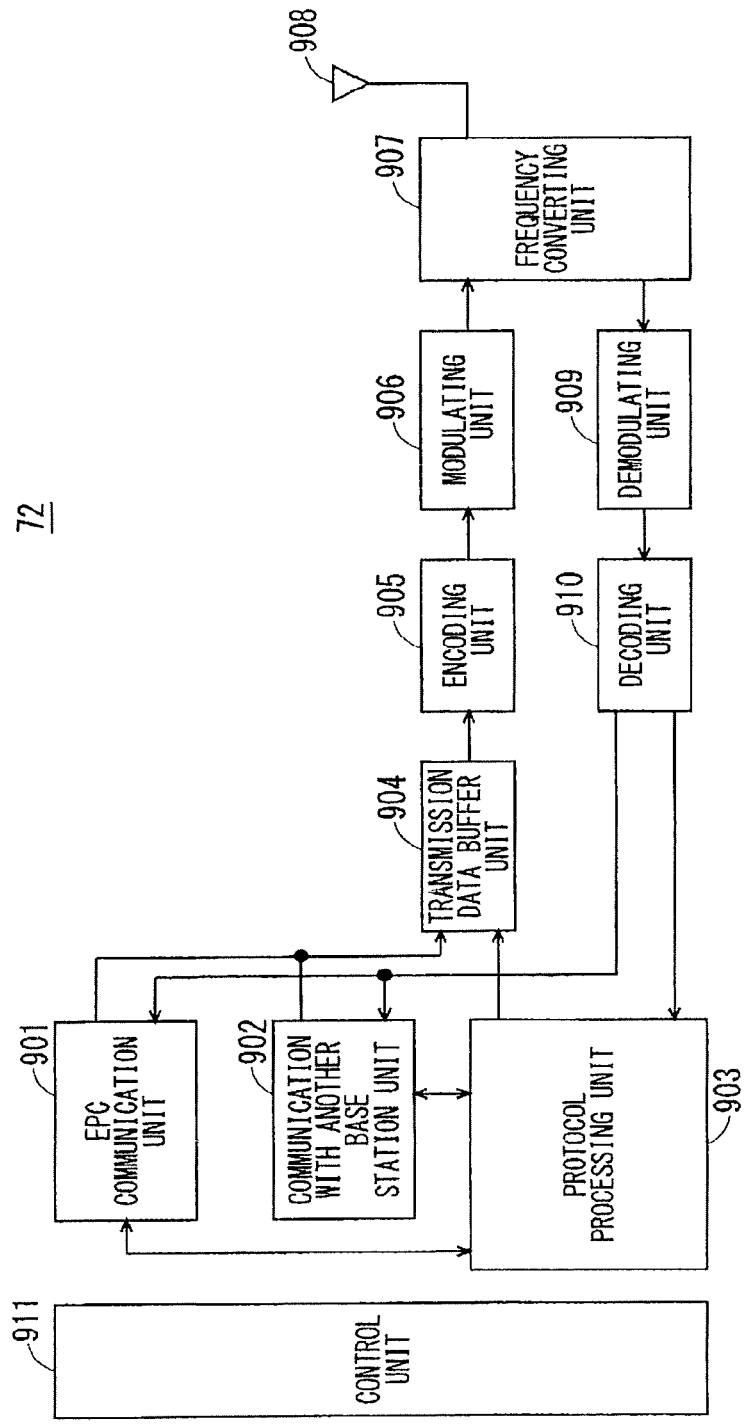
FIG. 9 is a block diagram showing the configuration of a base station 72 of FIG. 7 being a base station according to the present invention.

FIG. 9 is a block diagram showing the configuration of the base station 72 of FIG. 7 being a base station according to the present invention. The transmission process of the base station 72 shown in FIG. 9 will be described. An EPC communication unit 901 performs data transmission and reception between the base station 72 and the EPC (such as MME unit 73 and HeNBGW 74). A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, while the user data is passed to the EPC communication unit 901 and the communication with another base station unit 902. A series of processes by the base station 72 is controlled by a control unit 911. This means that, though not shown in FIG. 9, the control unit 911 is connected to the respective units 901 to 910.

Described below are the functions of the Home-eNB 72-2 currently under discussion in 3GPP (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in the case of connection to the HeNBGW 74. The Home-eNB 72-2 is connected only to one HeNBGW 74. In other words, in the case of the connection to the HeN- BGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The tracking area code (TAC) and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of by the Home-eNB 72-2. The Home-eNB 72-2 may be deployed without network planning. In this case, the Horne-eNB 72-2 is moved from one geographical area to another geographical area. The Home-eNB 72-2 in this case is accordingly required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission and reception between the MME 73a and a PDN GW. A base station communication unit 1002 performs data transmission and reception between the MME 73a and the base station 72 by means of the S1 interface. If the data received from the PDN GW is user data, the user data is passed from the PDN GW communication unit 1001 to the base station communication unit 1002 via a user plane communication unit 1003 and is then transmitted to one or a plurality of base stations 72. If the data received from the base station 72 is user data, the user data is passed from the base station communication unit 1002 to the PDN GW communication unit 1001 via the user plane communication unit 1003 and is then transmitted to the PDN GW.

If the data received from the PDN GW is control data, the control data is passed from the PDN GW communication unit 1001 to a control plane control unit 1005. If the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73a and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, an idle state mobility managing unit 1005-3, or other unit, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, update, and search of a tracking area of one or a plurality of user equipments 71 being served thereby, and tracking area list management.

The MME 73a begins a paging protocol by transmitting a paging message to the cell belonging to a tracking area in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (for example, added, deleted, updated, or searched). For example, the relationship may be the relationship between one or a plurality of user equipments whose user access registration has been performed with a CSG-ID and the CSG cells belonging to this CSG-ID. In the whitelist management, the relationship between the user equipment and the CSG-ID is managed (for example, added, deleted, updated, or searched). As an example, the whitelist may store one or a plurality of CSG-IDs with which user registration has been performed by a user equipment. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

Described below is the function of the MME 73a currently under discussion of 3GPP (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 of FIG. 7 being a HeNBGW according to the present invention. An EPC communication unit 1101 performs data transmission and reception between the HeNBGW 74 and the MME 73a by means of the S1 interface. A base station communication unit 1102 performs data transmission and reception between the HeNBGW 74 and the Home-eNB 72-2 by means of the S1 interface. A location processing unit 1103 performs the process of transmitting, to a plurality of Home-eNBs 72-2, the registration information or the like of the data transmitted from the MME 73a via the EPC communication unit 1101. The data processed by the location processing unit 1103 is passed to the base station communication unit 1102 and is passed to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

Described below is the function of the HeNBGW 74 currently under discussion of 3GPP (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73a. When the HeNBGW 74 is deployed, the procedure that is not associated with the user equipment 71 is communicated between the Home-eNB 72-2 and the HeNBGW 74 and between the HeNBGW 74 and the MME 73a. The X2 interface is not established between the HeN- BGW 74 and another node. The HeNBGW 74 recognizes the execution of paging optimization as an option.

Figure 12:
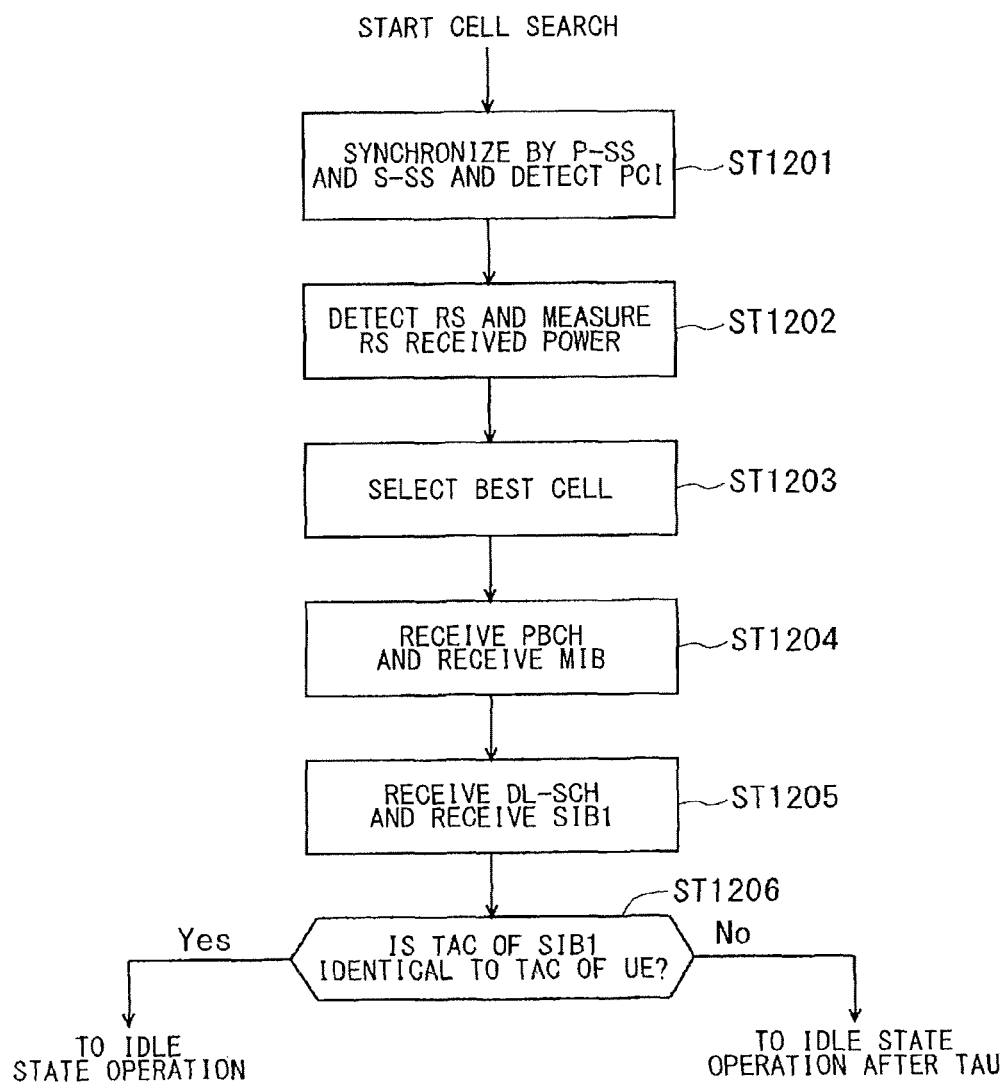
FIG. 12 is a flowchart showing an outline from a cell search to an idle state operation performed by a user equipment (UE) in the LTE communication system.

An example of a cell search method in a mobile communication system will be described next. FIG. 12 is a flowchart showing an outline from a cell search to an idle state operation performed by a user equipment (UE) in the LTE communication system. When starting a cell search, in Step ST1201, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS). The number of PCIs is currently studied in 504 ways. The 504 ways of PCIs are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, the cell having the highest RS received power, that is, the best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell on the basis of the cell configuration information of the MIB, to thereby obtain a system information block (SIB) 1 of the broadcast information BCCH. The SIB1 contains the information about the access to the cell, information about cell selection, and scheduling information on other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area list that has already been possessed by the user equipment. The tracking area list is also referred to as a TAI list. TAI is a TA identity and is composed of a mobile country code (MCC), a mobile network code (MNC), and a tracking area code (TAC). MCC is a country code. MNC is a network code. TAC is the code number of a tracking area.

If the TAC received in Step ST1205 is identical to the TAC included in the tracking area list as a result of the comparison of Step ST1206, the user equipment enters an idle state operation in the cell. If the TAC received in Step ST1205 is not included in the tracking area list as a result of the comparison, the user equipment requires a core network (EPC) including MME and the like to change a tracking area through the cell for performing tracking area update (TAU).

The core network updates the tracking area list on the basis of an identification number (such as a UE-ID) of the user equipment transmitted from the user equipment together with a TAU request signal. The core network transmits the updated tracking area list to the user equipment. The user equipment rewrites (updates) the TAC list of the user equipment on the basis of the received tracking area list. After that, the user equipment enters the idle state operation in the cell.

In the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. One CSG may include a plurality of CSG cells. After being registered with any one of the CSG cells, the user equipment can access another CSG cell of the CSG to which the registered CSG cell belongs.

Alternatively, the Home-eNB in the LTE and LTE-A and the Home-NB in the UMTS are used as CSG cells in some cases. The user equipment registered with the CSG cell has a whitelist. Specifically, the whitelist is stored in a subscriber identity module (SIM) or USIM. The whitelist stores the CSG information of the CSG cell with which the user equipment has been registered. Specifically, the CSG information may be CSG-ID, tracking area identity (TAD, or TAC. Any one of the CSG-ID and TAC is adequate as long as they are associated with each other. Alternatively, ECGI is adequate as long as the CSG-ID and TAC are associated with ECGI.

As can be seen from the above, the user equipment that has no whitelist (including a case where the whitelist is empty in the present invention) is not allowed to access the CSG cell but is allowed to access the non-CSG cell only. On the other hand, the user equipment that has a whitelist is allowed to access the CSG cell of the CSG-ID with which registration has been performed as well as the non-CSG cell.

The HeNB and HNB are required to support various services. For example, in certain service, an operator causes the predetermined HeNB and HNB to register user equipments therein and permits only the registered user equipments to access the cells of the HeNB and HNB, increasing radio resources available for the user equipments, which enables high-speed communication. The operator correspondingly sets a high charge compared with a normal service.

In order to achieve the above-mentioned service, the closed subscriber group (CSG) cell accessible only to the registered (subscribed or member) user equipments is introduced. A large number of closed subscriber group (CSG) cells are required to be installed in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells.

The HeNB/HNB is required not only to complement the communication outside the coverage of the macro cell (area complementing HeNB/HNB) but also to support various services as described above (service providing HeNB/

HNB). As a result, the HeNB/HNB is installed within the coverage of the macro cell in some cases.

Widespread use of smartphones and tablet terminals explosively increases traffic in cellular radio communications, causing a fear of insufficient radio resources all over the world. To increase spectral efficiency, accordingly, it is studied to downsize cells for further spatial separation.

FIG. 13 shows the concept of the configuration of conventional cells. A macro eNB (macro cell) constitutes a relatively-wide-range area coverage 1301. Conventionally, relatively-wide-range coverages configured by a plurality of macro eNBs (macro cells) cover an area.

Figure 14:
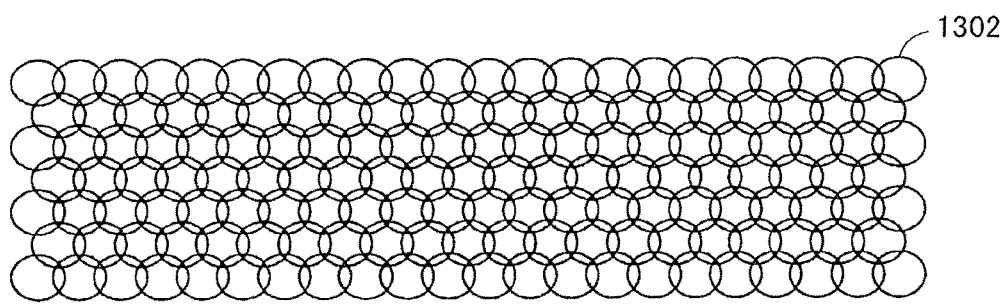
FIG. 14 shows the concept of the configuration of downsized cells.

FIG. 14 shows the concept of the configuration of downsized cells. The small eNB (small cell) constitutes a relatively-narrow-range coverage 1302 compared with the coverage 1301 of the macro eNB (macro cell). Thus, in order to cover an area as in the conventional case, a larger number of small eNBs (small cells) than the macro eNBs (macro cells) are required.

Figure 15:
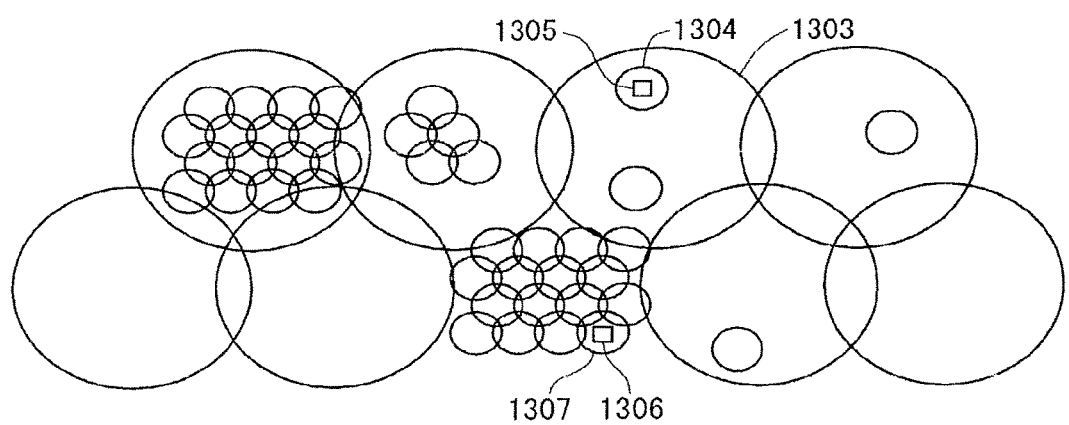
FIG. 15 shows the concept of the configuration of cells in which macro eNBs (macro cells) and small eNBs (small cells) coexist.

FIG. 15 shows the concept of the configuration of cells in which macro eNBs (macro cells) and small eNBs (small cells) coexist. The macro eNB (macro cell) constitutes a relatively-wide-range coverage 1303. The small eNB (small cell) constitutes a relatively-narrow-range coverage 1304 compared with the coverage 1303 of the macro eNB (macro cell). FIG. 15 also shows the case where the coverage of an eNB (cell) is included in the coverage of another eNB (cell).

In the configuration of cells shown in FIG. 15, the coverage 1303 of the macro eNB (macro cell) and the coverage 1304 of the small eNB (small cell) may overlap each other in a complicated manner. Or, the coverage 1303 of the macro eNB (macro cell) and a coverage 1307 of the small eNB (small cell) may not overlap each other. Further, a large number of small eNBs (small cells) may be configured in the coverage of one macro eNB (macro cell).

The problem solved in the first embodiment will be described below with reference to FIG. 15. The place within the coverage 1303 constituted by the macro eNB (macro cell), such as the place of the small cell 1305, and the place outside the coverage 1303 of the macro cell, such as the place of the small cell 1306, are both studied as the places in which a small cell is installed.

Herein, the macro cell refers to a cell constituting a relatively-wide-range coverage, that is, a cell having a relatively wide coverage area, whereas the macro eNB refers to an eNB constituting the macro cell. The macro eNB may be, for example, a "wide area base station" (see TS 36.141 V11.1.0 by 3GPP (hereinafter, referred to as "Non-Patent Document 11")). The macro eNB corresponds to a large-scale base station device.

The small cell refers to a cell constituting a relatively-narrow-range coverage, that is, a cell having a relatively narrow coverage area, whereas the small eNB refers to an eNB constituting a small cell. The small eNB may be, for example, a low power node, local area node, or hotspot. Alternatively, the small eNB may be a pico eNB constituting a pico cell, a femto eNB constituting a femto cell, HeNB, RRH, RRU, RRE, or RN. Still alternatively, the small eNB may be a "local area base station" or "home base station" (see Non-Patent Document 11). The small eNB corresponds to a small-scale base station device.

A standalone mode, in which a small cell operates similarly to a macro cell, and a macro support mode, in which a small cell operates in association with or in coordination with a macro cell, are studied as the operation modes of small cells. The following two, (1) and (2), will be disclosed as specific examples of the macro support mode.

(1) 3GPP has proposed control/user data plane split (C/U plane split) and multi-stream as the method of performing communication using a plurality of cells without establishing a plurality of RRC connections (see RWS-120010 by 3GPP (hereinafter, referred to as "Non-Patent Document 12") and RWS-120006 by 3GPP (hereinafter, referred to as "Non-Patent Document 13")). It is conceivable that in the control/user data plane split (C/U plane split), the macro cell transmits and receives a control plane (C plane) and the small cell transmits and receives a user data plane (U plane).

(2) 3GPP has discussed additional carrier types (see the report of RAN1 66BIS meeting by 3GPP (hereinafter, referred to as "Non-Patent Document 14")). Hereinafter, the additional carrier type may be referred to as a new carrier type (NCT). It is studied that an NCT is configured by a small cell.

It is conceivable that a large number of small cells will be installed. Without any contrivance, an operator needs to configure the large number of small cells by taking into account an installation place or a mode supported by the small cell per small cell. This results in complicated operation and administration for the operator when a small cell is installed.

Described below is a solution in the first embodiment. The installed small cell notifies the already installed network equipment of its own capability. The network equipment that has received the capability of the installed small cell from the small cell performs, on the small cell, a configuration suitable for the capability of the small cell. The network equipment may select a configuration parameter suitable for the capability of the small cell on the basis of the received capability of the small cell to perform a configuration suitable for the capability of the small cell. The network equipment corresponds to a network device.

The solution in the first embodiment eliminates the need for an operator to configure a small cell by taking into account an installation place or a mode supported by the small cell per small cell every time a small cell is installed. This avoids operation and administration for the operator becoming complicated when a small cell is installed.

The solution in the first embodiment will be specifically described below. The following four, (1) to (4), will be disclosed as specific examples of the already installed network equipment. The MME, OAM, and HeNBGW described below correspond to higher-level devices. Herein, the higher-level device refers to a device located on the core network side relative to a base station (eNB).

(1) Base station (eNB).
(2) MME.
(3) Operation administration and maintenance (OAM).
(4) HeNBGW.

When notifying the network equipment of its own capability, the small cell may also request its own configuration. In other words, the small cell may notify the network equipment of its own capability and also request the configuration of its own operation mode.

In place of notifying the network equipment of its own capability, the small cell may request its own configuration or the configuration of its own operation mode. When requesting its own configuration, the small cell may also notify its own capability.

The installed small cell may notify a neighbor eNB (neighbor cell), such as another small cell or a macro cell, of its own capability. If the neighbor eNB that has been notified of the capability from the small cell is another small cell, the other small cell may notify its own capability as a response to the notification.

The installed small cell may notify the network equipment of its own capability if a predetermined condition is met or may not notify the network equipment of its own capability if a predetermined condition is not met. The following two, (1) and (2), will be disclosed as specific examples of the predetermined condition.

(1) A predetermined condition is set to whether a small cell is installed in the coverage of another cell. If a small cell is installed in the coverage of another cell, the small cell notifies the network equipment of its own capability. If a small cell is not installed in the coverage of another cell, the small cell does not notify the network equipment of its own capability. If a small cell is not installed in the coverage of another cell, also, the small cell may start operating in the standalone mode. This is effectively applied to the case where the operation in the macro support mode is not achieved if a small cell is not installed in the coverage of another cell.

As in the specific example (1), by setting a predetermined condition to whether a small cell is installed in the coverage of another cell, a configuration suitable for the installation place of a small cell is enabled without an operator. This avoids operator's operation and administration becoming complicated when a small cell is installed.

(2) A predetermined condition is set to whether a small cell is installed in the coverage of a macro cell. The macro cell with a small cell installed in its own coverage is referred to as a "coverage macro cell." If a small cell is installed in the coverage of a macro cell, the small cell notifies the network equipment of its own capability. If a small cell is not installed in the coverage of a macro cell, the small cell does not notify the network equipment of its own capability. If a small cell is not installed in the coverage of a macro cell, also, the small cell may start operating in the standalone mode. This is effectively applied to the case where the operation in the macro support mode is not achieved if a small cell is not installed in the coverage of a macro cell.

As in the specific example (2), by setting a predetermined condition to whether a small cell is installed in the coverage of a macro cell, the configuration suitable for the installation place of a small cell is achieved without an operator. This avoids operator's operation and administration becoming complicated when a small cell is installed.

Disclosed below is a specific example of the method of judging whether a small cell is installed in the coverage of another cell or a macro cell. The small cell performs cell search (neighbor cell search) to judge whether a cell having reception quality not less than a predetermined threshold is present. One specific example of the reception quality is RS received power. If judging that a cell having reception quality not less than a predetermined threshold is present, the small cell judges that it is installed in the coverage of another cell or a macro cell. If judging that no cell having reception quality not less than a predetermined threshold is present, the small cell judges that it is not installed in the coverage of another cell or a macro cell.

If a small cell is installed in the coverage of a macro cell in the specific example (2) of the predetermined condition, the small cell may notify the coverage macro cell of its own capability. It is conceivable that when a small cell operates in the macro support mode, a macro cell operating in association with or in coordination with the small cell will serve as a coverage macro cell. In that case, the small cell notifying the coverage macro cell of its own capability means that in operating in the macro support mode, the small cell notifies a macro cell operating, for example, in association with the small cell of its own capability. The macro cell, which has received the capability of the small cell and operates, for example, in association with the small cell operating in the macro support mode, can perform a configuration suitable for the capability of the small cell on the small cell. This enables a communication system capable of further smooth operation and administration in the case where a small cell operates in the macro support mode.

In the following description, the operation in which a small cell notifies its own capability may be referred to as a "capability notifying operation."

The following four, (1) to (4), will be disclosed as specific examples of the capability notifying operation when a plurality of coverage macro cells are present for a small cell.

(1) A small cell notifies a coverage macro cell, which has the highest reception quality obtained through cell search by the small cell, of capability.

(2) A small cell notifies all coverage macro cells of capability. In this case, which coverage macro cell is to perform a configuration suitable for the capability of the small cell is adjusted among the coverage macro cells that have received the capability.

(3) A higher-level device notifies a small cell of the number of coverage macro cells being capability notification destinations. The small cell notifies coverage macro cells not greater than this number of capability. The small cell may notify the coverage macro cells having higher reception qualities in order.

(4) A higher-level device notifies a small cell of a coverage macro cell being a capability notification destination. The small cell notifies the coverage macro cell of capability.

Disclosed below is a specific example of the method in which a small cell judges whether a target cell is a macro cell in cell search. The cell broadcasts an indicator as to whether a target cell is a macro cell. As a result of cell search, the small cell receives the broadcast information of a cell having reception quality not less than a predetermined threshold, thereby checking an indicator as to whether a target cell is a macro cell.

The cell may broadcast an indicator as to whether it supports the macro support mode. As a result of cell search, the small cell receives the broadcast information of a cell having reception quality not less than a predetermined threshold, thereby checking an indicator as to whether the cell supports the macro cell support mode. In the present invention, the macro cell which has a small cell installed in its own coverage and also supports the macro support mode, may be a "coverage macro cell." This is because even a macro cell with a small cell installed in its own coverage cannot support the operation of the small cell in association with or in coordination with the macro cell if the macro cell does not support the macro support mode.

The small cell notifies network equipment of capability information indicating its own capability, for example, a capability parameter indicating its own capability, thereby notifying the network equipment of its own capability. The following seven, (1) to (7), will be disclosed as specific examples of the capability (capability parameter) of a small cell that is notified to the network equipment by the small cell.

(1) Indication that a cell is a small cell. This allows the already installed network equipment to recognize that a newly installed cell is a small cell without an operator.

(2) Information on a mode to be supported. Examples of the mode include the standalone mode and the macro support. The macro support mode is classified into the following modes: (2-1) control/user data plane split (C/U plane split) mode and (2-2) NCT mode. For the (2-2) NCT mode, any one or all of the seven capability parameters, (2-2-1) to (2-2-7) below, may be further notified: (2-2-1) whether carrier aggregation is enabled, (2-2-2) whether a radio resource of a small cell and a radio resource of another cell can be aggregated (referred to as "cell aggregation"), (2-2-3) a bandwidth for enabling transmission and reception, (2-2-4) a frequency band for enabling transmission and reception, (2-2-5) the number of CCs or the number of cells that can be supported, (2-2-6) a carrier frequency for enabling transmission and reception, and (2-2-7) a CRS mapping location. This specific example (2) allows the already installed network equipment to obtain the information on a mode to be supported by a newly installed small cell without an operator.

(3) Cell identification information of a coverage cell detected in cell search by the small cell. Specific examples of the cell identification information include PCI and cell global identifier (CGI). The specific example (3) simplifies, in the case where the already installed network equipment causes a newly installed small cell to operate in the macro support mode, the selection of a macro cell to be operated together without an operator. Also, the already installed network equipment can obtain information on the radio environment in the place where a small cell is actually installed, allowing for the selection of a more suitable cell as a macro cell to be operated together.

(4) Reception quality of (3) above.

(5) Information on the installation place of the small cell (location information).

(6) Transmission power, which may be the rank of a base station. This allows the already installed network equipment to predict the size of the coverage of a newly installed small cell without an operator.

(7) Combination of (1) to (6) above.

The following four, (1) to (4), will be disclosed as specific examples of the interface to be used in notification of capability from a small cell to network equipment.

(1) Examples of the interface in the case where the network equipment is a base station include an X2 interface and an S1 interface via an MME. A similar interface can be used also in the case where a small cell notifies a neighbor eNB (neighbor cell) of its own capability.

(2) An example interface in the case where the network equipment is an MME is an S1 interface.

(3) An example interface in the case where the network equipment is HeNBGW is an S1 interface.

(4) A new interface may be provided.

The following two, (1) and (2), will be disclosed as specific examples of the notification method in the case where an X2 interface is used in the notification of capability from a small cell to network equipment.

(1) New signaling is provided.

(2) A new parameter is added to an "X2 SETUP REQUEST" message (see Chapter 9.1.2.3 of TS 36.423 V11.3.0 by 3GPP (hereinafter, referred to as "Non-Patent Document 15")) being the existing signaling, and the message is notified. The "X2 SETUP REQUEST" message is a message used when an eNB transmits initial information to a neighbor eNB. Thus, a small cell notifies its own capability in the "X2 SETUP REQUEST" message, and can accordingly transmit and receive similar parameters in one operation. This avoids a communication system becoming more complicated.

The following two, (1) and (2), will be disclosed as specific examples of the notification method in the case where an S1 interface is used in the notification of capability from a small cell to network equipment.

(1) New signaling is provided.

(2) A new parameter is added to the "S1 SETUP REQUEST" message (see Chapter 9.1.8.4 of TS 36.413 V11.2.0 by 3GPP (hereinafter, referred to as "Non-Patent Document 16")) being the existing signaling, and the message is notified. The "S1 SETUP REQUEST" message is a message used when an eNB transmits initial information to the MME. Thus, a small cell notifies its own capability in the "S1 SETUP REQUEST" message, and can accordingly transmit and receive similar parameters in one operation. This avoids a communication system becoming more complicated.

The following five, (1) to (5), will be disclosed as specific examples of the configuration parameter in the case where the network equipment performs, on a small cell, a configuration suitable for the cability of the small cell.

(1) From among the modes supported by a small cell, a suitable mode is configured. In other words, an operation mode of the small cell, which is selected from among the modes supported by the small cell, is configured. As a specific example, the type, the standalone mode or the macro support mode, is configured. As a specific example of the method of selecting an operation mode, the standalone mode is selected for a higher processing load of the coverage macro cell, whereas the macro support mode is selected for a lower processing load of the coverage macro cell.

The following five, (1-1) to (1-5), will be disclosed as specific examples of the configuration parameter in the case where the macro support mode is configured.

(1-1) The type of an operation mode in the macro support mode. A specific example is a control/user data plane split (C/U plane split) mode or an NCT mode. If a small cell supports the macro support mode other than the modes above, the type of the corresponding operation mode may be selected and configured. Alternatively, for example, the configurations of the control/user data plane split (C/U plane split) mode and the NCT mode may be enabled.

(1-2) Identification information of a macro cell to be operated together. The following two, (1-2-1) and (1-2-2), will be disclosed as specific examples of the macro cell to be operated together.

(1-2-1) A coverage macro cell or, among coverage macro cells for a small cell, a coverage macro cell (also referred to as a "first coverage macro cell") having the best reception quality in cell search when a small cell is installed.

(1-2-2) A cell that performs scheduling of resources of the small cell for the UE (also referred to as a "cell being a scheduling entity"), a cell that performs scheduling of performing cross-carrier scheduling for a small cell (also referred to as a "cell being a scheduling entity"), or a cell for which a UE that performs transmission and reception using the resource of a small cell monitors PDCCH (also referred to as a "cell being a scheduling entity").

Disclosed below are specific examples of the macro cell to be operated together when the operation mode in the macro support mode is the control/user data plane split (C/U plane split) mode. Herein, the cell that transmits and receives a control plane to and from the UE, to and from which a small cell transmits and receives user data plane, is a macro cell to be operated together. Examples of such a macro cell include a coverage macro cell and a first coverage macro cell.

Specific examples of the macro cell to be operated together when the operation mode in the macro support mode is the NCT mode will be disclosed below. Herein, among the cells that are subjected to cell aggregation by the UE, the cell that performs scheduling of resources of the small cell for the UE (also referred to as a "cell being a scheduling entity") is a macro cell to be operated together. Or, the cell that performs scheduling of performing cross-carrier scheduling for a small cell (also referred to as a "cell being a scheduling entity") is a macro cell to be operated together. Or, the cell for which the UE that performs transmission and reception using the resource of a small cell monitors PDCCH (also referred to as a "cell being a scheduling entity") is a macro cell to be operated together.

The cell being a scheduling entity is, for example, a coverage macro cell for a small cell. Further, the cell being a scheduling entity is a first coverage macro cell.

(1-3) Carrier frequency.
(1-4) Bandwidth.
(1-5) Frequency band.
(2) Energy saving (ES) policy, which will be specifically disclosed in a second embodiment.
(3) Carrier frequency of a coverage macro cell.
(4) Identifier of a group to which a small cell belongs (hereinafter, also referred to as a "small cell cluster" or a "small cell group"). The small cell may belong to a plurality of small cell clusters. Or, numbers of the small cells in a small cell cluster may be notified together. This allows for the use of the "identifier of a small cell cluster to which a small cell belongs" or the "information containing the identifier of a small cell cluster and numbers of the small cells in a small cell cluster" as the small cell identification information being the information for identifying a small cell, in addition to PCI.

A large number of small cells can be installed in a narrow range. The PCIs are available in total of 504 types of codes, which are finite. Thus, compared with before the introduction of small cells, there is a concern of PCIs overlapping after the introduction of small cells. In overlapping of PCIs, a cell can be identified using the CGI and the ECGI. However, high bit counts of the CGI and ECGI require a large amount of radio resources to exchange the CGI and ECGI between, for example, the UE and the eNB, compared with the case where the PCIs are exchanged therebetween.

If the "information containing PCI and the identifier of a small cell cluster to which a small cell belongs" or the "information containing PCI, the identifier of a small cell cluster, and numbers of small cells in a small cell cluster" requires a low bit count compared with the case of CGI and ECGI, it is effective to use the "information containing PCI and the identifier of a small cell cluster to which a small cell belongs" or the "information containing PCI, the identifier of a small cell cluster, and numbers of small cells in a small cell cluster" as a cell identification method when PCIs overlap each other, from the viewpoint of effective use of radio resources. Also, the identification information of small cells belonging to the same small cell cluster may be notified together.

(5) Combination of (1) to (4) above.

The following five, (1) to (5), will be disclosed as specific examples of the small cell cluster.

(1) A group of small cells whose scheduling entities are the same. A group of small cells whose concentrated control nodes are the same. For example, a group of small cells controlled by the same concentrated control node, the same entity engaging in scheduling, or the same concentrator in cell aggregation and in CoMP.

(2) A group of small cells according to an installation place. A group of small cells installed in a specific area. For example, a group of small cells installed in the same station yard or a group of small cells installed in the same school.

(3) A group of small cells having the same ES policy.

(4) A group of small cells belonging to the same CoMP cooperating set.

(5) A group of small cells belonging to the same frequency layer.

Specific examples of the interface used in the notification of a configuration from network equipment to a small cell are similar to the specific examples of the interface used in the notification of capability from a small cell to network equipment, which will not be described here.

The following two, (1) and (2), will be disclosed as specific examples of the notification method in the case where an X2 interface is used in the notification from network equipment to a small cell.

(1) New signaling is provided.
(2) A new parameter is added to the "X2 SETUP RESPONSE" message being the existing signaling (see Chapter 9.1.2.4 of Non-Patent Document 15), and the message is notified. The "X2 SETUP RESPONSE" message is a response message used in transmission of initial information from an eNB to a neighbor eNB. Thus, notification of the configuration for a small cell in the "X2 SETUP RESPONSE" message avoids a communication system becoming more complicated.

The following two, (1) and (2), will be disclosed as specific examples of the notification method in the case where an S1 interface is used in notification of capability from a small cell to network equipment.

(1) New signaling is provided.
(2) A new parameter is added to the "S1 SETUP RESPONSE" message being the existing signaling (see Chapter 9.1.8.5 of Non-Patent Document 16), and the message is notified. The "S1 SETUP RESPONSE" message is a response message used in transmission of initial information from an eNB to an MME. Thus, notification of the configuration for a small cell in the "S1 SETUP RESPONSE" message avoids a communication system becoming more complicated.

The following five, (1) to (5), will be disclosed as specific examples of the operation of a small cell when the small cell receives a configuration parameter from network equipment.

(1) A small cell starts operating in a mode that has been configured, that is, an operation mode that has been configured.

(1-1) The case where, for example, the standalone mode is configured will be described. In this case, an operation similar to that of a normal cell is performed.

(1-2) The case where, for example, the macro support mode is configured will be described.

(1-2-1) A small cell notifies a UE being served thereby that the small cell is operating in the macro support mode. For example, the small cell notifies a UE being served thereby that the small cell is a cell on which camping (CAMP ON) cannot be performed.

The following two, (1-2-1-a) and (1-2-1-b), will be disclosed as specific examples of the method in which a small cell notifies a UE being served thereby.

(1-2-1-a) Notification is made in broadcast information. This allows both of a UE in an idle state (RRC_IDLE) and a UE in a connected state (RRC_CONNECTED) to receive the information.

(1-2-1-b) In broadcast information, "cellBarred" is changed to "barred." The use of the existing parameter as described above avoids a communication system becoming more complicated. It is also possible to construct a communication system having excellent backward compatibility.

(1-2-2) A small cell does not transmit PDCCH.
(1-2-3) A small cell does not transmit paging.

Described below is a specific example of the operation of a small cell when the operation mode in the macro support mode is configured to the control/user data plane split (C/U plane split) mode. The operation as a user data plane cell is started. In other words, the operations in an RRC protocol, a PDCP protocol, and an RLC protocol for control plane connection are stopped.

Described below are specific examples of the operation of a small cell when the operation mode in the macro support mode is configured to the NCT mode. The number of CRS mappings is reduced more than in the case of a normal cell. CRS is transmitted at a mapping location in NCT. PBCH and MIB are not transmitted. PDCCH is not transmitted. A paging message is not transmitted.

(2) A small cell starts operating in the configured ES policy.

(3) If the carrier frequency of a coverage macro cell is configured, a small cell notifies a UE being served thereby of the configured carrier frequency of the coverage macro cell. Specific examples of the method in which a small cell notifies a UE being served thereby will be disclosed below.

A small cell notifies that the carrier frequency of a coverage macro cell is a frequency with high priority in cell reselection. Specifically, notification is made in an RRC message. Notification is made in the "RRC Connection Release" message. Or, notification is made in broadcast information. A carrier frequency is configured to a frequency with high "cell Reselection Priority" of the system information in broadcast information (see Chapters 5.2.4.1 and 5.2.4.7 of Non-Patent Document 2).

As in the specific example (3), with the small cell notifying a UE being served thereby of the carrier frequency of the coverage macro cell, the UE being served by the small cell can preferentially select the coverage macro cell when a small cell shifts to the ES operation.

(4) A small cell notifies a neighbor cell of a configuration parameter. A small cell may notify another small cell in the same cluster of a configuration parameter. The neighbor cell may be a cell judged to have the reception quality not less than a predetermined threshold in cell search performed by a small cell. An X2 interface can be used in the notification of a configuration parameter. Specific examples of the notification method in the case where an X2 interface is used are similar to the specific examples of the above-mentioned notification method in the case where an X2 interface is used in the notification of capability from a small cell to network equipment, which will not be described here.

(5) Combination of (1) to (4) above.

Next, a specific example of the sequence of a communication system in the case where the solution of the first embodiment is used will be described with reference to FIGS. 16 and 17. FIGS. 16 and 17 show an example sequence of the communication system in the first embodiment. FIG. 16 is continuous with FIG. 17 at a boundary BL1.

In Step ST1401, a small cell is installed. In Step ST1402, the small cell performs neighbor cell search.

In Step ST1403, the small cell judges whether it is installed in the coverage of a macro cell, thereby judging whether a coverage macro cell is present. If judging that it is installed in the coverage of a macro cell, the small cell judges that a coverage macro cell is present and then moves to Step ST1404. If judging that it is not installed in the coverage of a macro cell, the small cell judges that no coverage macro cell is present and then moves to Step ST1411.

In Steps ST1404 and ST1405, the small cell notifies neighbor cells including the coverage macro cell of its own capability. Specifically, the small cell notifies the coverage macro cell of its own capability in Step ST1404 and notifies the neighbor cell other than the coverage macro cell of its own capability in Step ST1405.

In Step ST1406, the coverage macro cell that has received the capability of the small cell in Step ST1404 selects a configuration suitable for the capability of the small cell. Specifically, the coverage macro cell selects a configuration parameter suitable for the capability of the small cell.

In Step ST1407, the coverage macro cell notifies the small cell of the configuration parameter selected in Step ST1406.

In Step ST1408, the small cell judges whether the configuration parameter received in Step ST1407 contains the carrier frequency of the coverage macro cell. If judging that the configuration parameter contains the carrier frequency of the coverage macro cell, the small cell moves to Step ST1409. If judging that the configuration parameter does not contain the carrier frequency of the coverage macro cell, the small cell moves to Step ST1410.

In Step ST1409, the small cell notifies a UE being served thereby of the carrier frequency of the coverage macro cell contained in the configuration parameter received in Step ST1407. The following three, (1) to (3), will be disclosed as specific examples of the reception method by a UE being served by the small cell: (1) when the carrier frequency of the coverage macro cell is mapped to the RRC message, in reception of an RRC message, (2) when the carrier frequency of the coverage macro cell is mapped to the broadcast information, in reception of broadcast information during cell selection or cell reselection, and (3) when the carrier frequency of the coverage macro cell is mapped to the broadcast information, in reception of update notification of system information.

In Step ST1410, the small cell judges whether the standalone mode has been configured on the basis of the configuration parameter received in Step ST1407. If judging that the standalone mode has been configured, the small cell moves to Step ST1411. If judging that the standalone mode has not been configured, the small cell moves to Step ST1412. If judging that the standalone mode has not been configured, the small cell may judge that the macro support mode has been configured and then move to Step ST1412.

In Step ST1411, the small cell starts operating in the standalone mode.

In Step ST1412, the small cell judges whether the control/user data plane split (C/U plane split) mode has been configured on the basis of the configuration parameter received in Step ST1407. If judging that the control/user data plane split (C/U plane split) mode has been configured, the small cell moves to Step ST1414. If judging that the control/user data plane split (C/U plane split) mode has not been configured, the small cell moves to Step ST1413.

In Step ST1413, the small cell judges whether the NCT mode has been configured on the basis of the configuration parameter received in Step ST1407. If judging that the NCT mode has been configured, the small cell moves to Step ST1415. If judging that the NCT mode has not been configured, the small cell ends the process in installation and then moves to another process. In the case where the macro support mode includes another mode in addition to the control/user data plane split (C/U plane split) mode and the NCT mode, however, the operation of the small cell is not limited to the above. In other words, the small cell judges whether another mode has been configured, and starts operating in the other mode if judging that the other mode has been configured, or ends the process in installation and then moves to another process if judging that the another mode has not been configured. The other process is not characteristic of the present invention, which will not be described here.

In Step ST1414, the small cell starts operating in the control/user data plane split (C/U plane split) mode. In Step ST1415, the small cell starts operating in the NCT mode.

The processes of Steps ST1412 to ST1415 are not limited to what is described above when, for example, the control/user data plane split (C/U plane split) mode and the NCT mode can be configured. In other words, it is judged whether the control/user data plane split (C/U plane split) mode and the NCT mode have been configured and, if it is judged that the modes have been configured, the operation is started in the control/user data plane split (C/U plane split) mode and the NCT mode.

In Step ST1417, the UE judges whether to perform cell selection or cell reselection. If judging not to perform cell selection or cell reselection, the UE repeats the process of Step ST1417. If judging to perform cell selection or cell reselection, the UE moves to Step ST1418.

In Step ST1418, the UE selects a cell in accordance with broadcast information. For example, in the case of having received the carrier frequency of the coverage macro cell in Step ST1409, the UE performs cell search preferentially from the carrier frequency of the coverage macro cell in cell selection or cell reselection.

The first embodiment achieves the following effects. When a small cell is installed, the small cell can start operating without an operator irrespective of the installation place of the small cell or the support mode of the small cell. This achieves easy operation and administration by the operator when a small cell is installed.

First Modification of First Embodiment

Although the first embodiment has disclosed a small cell cluster, nothing has been disclosed as a result of the discussion in 3GPP as to the method of managing the small cell cluster disclosed in the first embodiment. This results in a problem that a unified operation of the communication system cannot be achieved. A first modification of the first embodiment will therefore disclose the method of managing a small cell cluster.

The method of managing a small cell cluster includes, for example, the following two steps (1) and (2). Steps (1) and (2) are performed in the stated order. The processes of Steps (1) and (2) can be performed repeatedly or as needed.

(1) Small cells to be included in a small cell cluster are determined. (2) A list of small cells included in a small cell cluster is stored in the entity that manages the small cell cluster.

The following six, (1-1) to (1-6), will be disclosed as specific examples of the method of determining small cells to be included in a small cell cluster of Step (1).

(1-1) Small cells to be included in a small cell cluster are determined on the basis of cell aggregation. For example, small cells are determined such that a small cell cluster includes small cells whose scheduling entities are the same.

(1-2) Small cells to be included in a small cell cluster are determined on the basis of an installation place. For example, small cells are determined such that a small cell cluster includes small cells installed in the same station yard. Or, for example, small cells are determined such that a small cell cluster includes small cells installed in the coverage of the same coverage macro cell. Or, for example, small cells are determined such that a small cell cluster includes small cells installed in the same tracking area (TA).

(1-3) Small cells to be included in a small cell cluster are determined on the basis of CoMP. For example, small cells are determined such that a small cell cluster includes small cells included in the same CoMP cooperating set.

(1-4) Small cells to be included in a small cell cluster are determined on the basis of the connected network equipment. For example, small cells are determined such that a small cell cluster includes small cells connected to the same MME. Or, for example, small cells are determined such that a small cell cluster includes small cells connected to the same HeNBGW.

(1-5) Small cells to be included in a small cell cluster are determined on the basis of the ES policy. For example, small cells are determined such that a small cell cluster includes small cells having the same ES policy. Or, for example, small cells are determined such that a small cell cluster includes small cells expected to shift from the normal operation to the energy saving operation at the same timing. Or, for example, small cells are determined such that a small cell cluster includes small cells expected to shift from the energy saving operation to the normal operation at the same timing.

(1-6) Combination of (1-1) to (1-5) above.

The following six, (2-1) to (2-6), will be disclosed as specific examples of the entity that manages a small cell cluster that stores a list of small cells included in a small cell cluster in Step (2).

(2-1) A scheduling entity in cell aggregation. A concentrated control node in cell aggregation. This specific example (2-1) is highly compatible with the specific example (1-1) of the method of determining small cells to be included in a small cell cluster. In other words, by causing the entity that manages a small cell cluster to be the scheduling entity in cell aggregation, the scheduling entity in cell aggregation is the same as the entity that manages a small cell cluster. This accordingly eliminates the need for exchanging, for example, the information on small cells whose scheduling entities are the same, avoiding a communication system becoming more complicated.

(2-2) A concentrated control entity for CoMP (also referred to as a "CoMP concentrator" or a "concentrated control node"). This specific example (2-2) is highly compatible with the specific example (1-3) of the method of determining small cells to be included in a small cell cluster. In other words, by causing the entity that manages a small cell cluster to be a CoMP concentrator, if a set of cells managed by one CoMP concentrator is a CoMP cooperating set, the entity that manages cells included in a CoMP cooperating set is the same as the entity that manages a small cell cluster. This accordingly eliminates the need for exchanging, for example, the information on small cells included in the same CoMP cooperating set, avoiding a communication system becoming more complicated.

(2-3) Operation administration and maintenance (OAM). This specific example (2-3) is highly compatible with the specific examples (1-2) and (1-5) of the method of determining small cells to be included in a small cell cluster. If a cell is newly installed, the cell may report its installation place to the OAM. In this case, by causing the entity that manages a small cell cluster to be the OAM, the entity that recognizes the installation place of the cell is the same as the entity that manages a small cell cluster. This accordingly eliminates the need for exchanging, for example, the information on an installation place of a cell, avoiding a communication system becoming more complicated. The OAM may configure an ES policy. In this case, by causing the entity that manages a small cell cluster to be the OAM, the entity that configures an ES policy is the same as the entity that manages a small cell cluster. This eliminates the need for exchanging, for example, the ES policy information of a cell, avoiding a communication system becoming more complicated.

(2-4) A coverage macro cell. This specific example (2-4) is highly compatible with the specific example (1-2) of the method of determining small cells to be included in a small cell cluster in the case where small cells are determined such that a small cell cluster includes small cells installed in the same coverage macro. The specific example (2-4) is also highly compatible with the specific example (1-5) of the method of determining small cells to be included in a small cell cluster. In other words, by causing the entity that manages a small cell cluster to be a coverage macro cell, if a coverage macro cell configures an ES policy, the entity that configures the ES policy is the same as the entity that manages a small cell cluster. This eliminates the need for exchanging, for example, the ES policy information of a cell, avoiding a communication system becoming more complicated.

(2-5) MME. This specific example (2-5) is highly compatible with the specific example (1-2) of the method of determining small cells to be included in a small cell cluster in the case where small cells are determined such that a small cell cluster includes small cells installed in the same TA. The specific example (2-5) is also highly compatible with the specific example (1-4) of the method of determining small cells to be included in a small cell cluster in the case where small cells are determined such that a small cell cluster includes small cells connected to the same MME. The MME manages a TA. Thus, the entity that recognizes small cells installed in the same TA is the same as the entity that manages a small cell cluster. This eliminates the need for exchanging, for example, the information on small cells installed in the same TA, avoiding a communication system becoming more complicated.

(2-6) HeNBGW. This specific example (2-6) is highly compatible with the specific example (1-2) of the method of determining small cells to be included in a small cell cluster in the case where small cells are determined such that a small cell cluster includes small cells installed in the same station yard. This specific example (2-6) is also highly compatible with the specific example (1-4) of the method of determining small cells to be included in a small cell cluster in the case where small cells are determined such that a small cell cluster includes small cells connected to the same HeNBGW. For example, this is the case where a HeNBGW is installed in a station yard and a HeNB in the station yard is connected to the HeNBGW. In such a case, by causing the entity that manages a small cell cluster to be a HeNBGW, the entity that recognizes small cells installed in the same station yard is the same as the entity that manages a small cell cluster. This accordingly eliminates the need for exchanging, for example, the information on small cells installed in the same station yard, avoiding a communication system becoming more complicated.

The first modification of the first embodiment achieves the following effect. The method of managing a small cell cluster is clarified, achieving a unified operation of a communication system.

Second Embodiment

Described below is a solution solved in the second embodiment. 3GPP has discussed energy saving (ES) of infrastructure. For ES, cells such as a small cell and a macro cell are configured to switch between a state in which a normal operation described below is performed (also referred to as an "active state" or "on-state") and a state in which an energy saving operation described below is performed (also referred to as a "dormant state" or "off-state"). Herein, the energy saving operation refers to an operation with reduced consumption energy compared with the normal operation. In the following description, the operation of switching from the on-state to the off-state may be referred to as "switch off," whereas the operation of switching from the off-state to the on-state may be referred to as "switch on."

Described below is the conventional ES policy. In the conventional ES policy, a cell switches itself off, specifically, shifts from the normal operation to the energy saving operation (also referrers to as "shifts from the active state to the dormant state"), by its own judgment. In switch-off, a cell notifies a neighbor cell that it is to switch itself off. When load increases, the neighbor cell requests switch-on, specifically, a shift from the energy saving operation to the normal operation (also referred to as "re-activation from the dormant state") of the cell being switched off (see Non-Patent Document 1).

Non-Patent Document 1 discloses that an operator can configure the ES function. The configured information contains the following (1) and (2): (1) the ability of an eNB to perform autonomous cell switch-off, and (2) the ability to re-activate dormant cells owned by a neighbor eNB.

Non-Patent Document 1 also discloses that the OAM configures the following (1) and (2): (1) policies used by the eNB for switch-off decision, and (2) policies used by neighbor eNBs for requesting the re-activation of a dormant cell.

The problem solved in the second embodiment will be described below with reference to FIG. 15. The place within the coverage 1303 configured by the macro eNB (macro cell), such as the small cell 1305, and the place outside the coverage 1303 of the macro cell, such as the small cell 1306, are studied as the installation places of small cells.

The standalone mode, in which a small cell operates similarly to a macro cell, and the macro support mode, in which a small cell operates in association with or in coordination with a macro cell, are both studied as the operation modes of small cells.

In the introduction of small cells, one type of ES policy conventionally employed may be inappropriate. Described below is a specific example of such an inappropriate case.

Even in the conventional ES policy, for higher load, the neighbor cell can request switch-on of a cell being switched off. Considered here is a case where a neighbor cell is a coverage macro cell and a large number of small cells are installed in the coverage macro cell. Suppose that the large number of small cells switch themselves off by their own judgment as in a conventional case. When its own load becomes higher, the coverage macro cell requests switch-on of the small cell being switched off. A large number of small cells are switched off in this case, and accordingly, the coverage macro cell requests switch-on of the large number of small cells. This increases the processing load of the coverage macro cell and also increases the information to be transmitted and received.

Described below is a solution in the second embodiment. In the second embodiment, an ES policy unique to a small cell different from a conventional one is newly provided. This achieves an ES operation optimum for a communication system in which a small cell is introduced. The following will specifically describe the solution in the second embodiment.

As described above, Non-Patent Document 1 discloses that the OAM configures policies used by the eNB for cell switch-off decision or policies used by neighbor eNBs for requesting the re-activation of a dormant cell. The "policies for cell switch-off decision" and the "policies for requesting the re-activation of a dormant cell," however, are merely variations of one type of the conventional ES policy. One type of the conventional ES policy is as follows: a cell switches itself off, specifically, shifts to the energy saving operation (also referred to as "shifts to the dormant state"), by its own judgment. In switch-off, the cell informs a neighbor cell that the cell is to switch itself off. When load becomes higher, the neighbor cell requests switch-on, specifically, a shift to the normal operation or reactivation of the cell being switched off (see Non-Patent Document 1).

The following two, (1) and (2), will be disclosed as specific examples of the ES policy unique to a small cell newly provided in the second embodiment.

(1) A small cell follows an instruction to permit the cell to switch itself off (hereinafter, also merely referred as "permit switch-off") or prohibit the cell from switching itself off (hereinafter, also merely referred to as "prohibit switch-off") from another cell. Another cell may be a concentrated control node for a small cell. Or, another cell may be an ES concentrated control node (also referred to as an "ES concentrator"). Or, when it is installed in the coverage of another cell, the small cell may follow an instruction to permit or prohibit switch-off from the other cell.

As the ES policy unique to a small cell, a small cell that has been instructed to permit switch-off operates as follows. A small cell can switch itself off by its own judgment. In switch-off, the small cell notifies a neighbor cell that it is to switch itself off. In notifying that is to switch itself off, the small cell may also notify an indicator as to whether it is a small cell. The small cell may also notify its own identifier. When requested to switch itself on from a neighbor cell, the small cell switches itself on.

The small cell that has been instructed to prohibit switch-off operates as follows. The small cell cannot switch itself off by its own judgment. In other words, the small cell does not switch itself off.

The small cell located in the coverage of another cell operates as in the ES policy unique to a small cell, and the small cell located outside the coverage of another cell operates as follows. The small cell can switch itself off by its own judgment. In switch-off, the small cell notifies a neighbor cell that it is to switch itself off. In notifying that it is to switch itself off, the small cell may also notify an indicator as to whether it is a small cell. Or, the small cell may also notify the identifier of its own cell. When requested to switch itself on from the neighbor cell, the small cell switches itself on.

(2) When installed in the coverage of a macro cell, the small cell follows an instruction to permit or prohibit switch-off from the coverage macro cell.

The small cell that has been instructed to permit switch-off operates as follows. The small cell can switch itself off by its own judgment. To switch itself off, the small cell notifies the coverage macro cell that it is to switch itself off. In notifying that it is to switch itself off, the small cell may also notify an indicator as to whether it is a small cell. The small cell may also notify its own identifier. When requested to switch itself on from the coverage macro cell, the small cell switches itself on.

The small cell that has been instructed to prohibit switch-off operates as follows. The small cell cannot switch itself off by its own judgment. In other words, the small cell does not switch itself off.

The small cell located outside the coverage of the macro cell operates as follows. The small cell can switch itself off by its own judgment. In switch-off, the small cell notifies a neighbor cell that it is to switch itself off. In notifying that it is to switch itself off, the small cell may also notify an indicator as to whether it is a small cell. The small cell may also notify its own identifier. When requested to switch itself on from the neighbor cell, the small cell switches itself on.

Specific examples of the method in which a small cell judges whether it is installed in the coverage of another cell or a macro cell are similar to those of the first embodiment, which will not be described here.

Specific examples of the method in which a small cell judges whether a target cell is a macro cell in cell search are similar to those of the first embodiment, which will not be described here.

The following two, (1-1) and (1-2), will be disclosed as specific examples of the operation in the case where a plurality of cells are present in the specific example (1) of the ES policy unique to a small cell.

(1-1) A small cell follows the instructions from all the other cells. Specifically, the small cell, which has been instructed to permit switch-off from all the other cells, operates as follows. The small cell can switch itself off by its own judgment. In switch-off, the small cell notifies a neighbor cell that it is to switch itself off. When requested to switch itself on from the neighbor cell, the small cell switches itself on.

The small cell, which has been instructed to prohibit switch-off from at least another cell, operates as follows. The small cell cannot switch itself off by its own judgment. In other words, the small cell does not switch itself off.

(1-2) A small cell follows an instruction of other cell that acts as a representative (hereinafter, also referred to as "representative other cell") among a plurality of other cells. Specifically, the small cell decides the representative other cell.

The small cell, which has been instructed to permit switch-off from the representative other cell, operates as follows. The small cell can switch itself off by its own judgment. In switch-off, the small cell notifies the representative other cell or a neighbor cell that it is to switch itself off. When requested to switch itself on from the representative other cell or the neighbor cell, the small cell switches itself on.

The small cell, which has been instructed to prohibit switch-off from the representative other cell, operates as follows. The small cell cannot switch itself off by its own judgment. In other words, the small cell does not switch itself off.

The following three, (1-2-1) to (1-2-3), will be disclosed as specific examples of the method of determining representative other cell.

(1-2-1) A cell having the highest reception quality in cell search by a small cell is representative other cell.

(1-2-2) A cell, which has performed a configuration suitable for the capability of a small cell using the first embodiment, is representative other cell.

(1-2-3) A cell, which is operated together with a small cell in the macro support mode, is representative other cell. Specific examples of the cell to be operated together with a small cell are similar to those of the first embodiment, which will not be described here.

The following two, (2-1) and (2-2), will be disclosed as specific examples of the operation in the case where a plurality of coverage macro cells are present in the specific example (2) of the ES policy unique to a small cell.

(2-1) The small cell follows the instructions of all the coverage macro cells. Specifically, the small cell, which has been instructed to permit switch-off from all the coverage macro cells, operates as follows. The small cell can switch itself off by its own judgment. In switch-off, the small cell notifies all the coverage macro cells that it is to switch itself off. When requested to switch itself on from the coverage macro cell, the small cell switches itself on.

The small cell, which has been instructed to prohibit switch-off from at least one coverage macro cell, operates as follows. The small cell cannot switch itself off by its own judgment. In other words, the small cell does not switch itself off.

(2-2) The small cell follows an instruction of a coverage macro cell that acts as a representative (hereinafter, also referred to as a "representative coverage macro cell") among a plurality of coverage macro cells. Specifically, the small cell determines a representative coverage macro cell.

The small cell, which has been instructed to permit switch-off from the representative coverage macro cell, operates as follows. The small cell can switch itself off by its own judgment. In switch-off, the small cell notifies the representative coverage macro cell or the coverage macro cell that it is to switch itself off. When requested to switch itself on from the representative coverage macro cell or the coverage macro cell, the small cell switches itself on.

The small cell, which has been instructed to prohibit switch-off from the representative coverage macro cell, operates as follows. The small cell cannot switch itself off by its own judgment. In other words, the small cell does not switch itself off.

The following three, (2-2-1) to (2-2-3), will be disclosed as specific examples of the method of determining a representative coverage macro cell.

(2-2-1) A coverage macro cell having the highest reception quality in cell search by a small cell is a representative coverage macro cell. In other words, the first coverage macro cell is a representative coverage macro cell.

(2-2-2) A coverage macro cell, which has performed a configuration suitable for the capability of a small cell using the first embodiment, is a representative coverage macro cell.

(2-2-3) A macro cell to be operated together with a small cell in the macro support mode is a representative coverage macro cell. Specific examples of the macro cell that is operated together with a small cell are similar to those of the first embodiment, which will not be described here.

The following three, (1) to (3), will be disclosed as specific examples of the entity that configures whether to use the ES policy unique to a small cell and of the method of configuring whether to use the ES policy unique to a small cell in the small cell (referred to as a "method of configuring an ES policy").

(1) Determination is made statically. The small cell uses the ES policy unique to a small cell. This eliminates the need for the configuration as to whether to use the ES policy unique to a small cell and the judgment as to whether to use the ES policy unique to a small cell in the small cell. Unlike specific examples (2) and (3) described below, configuration processing is not required, and signaling for configuration or the like is not required, avoiding a communication system becoming more complicated.

(2) A small cell per se configures whether to use the ES policy unique to a small cell. Configuring by the small cell per se eliminates the need for judging whether to use the ES policy in the small cell. The following two, (2-1) and (2-2), will be disclosed as specific examples in that case.

(2-1) If a small cell is installed in the coverage of another cell, that is, if a small cell has a coverage cell, the small cell configures to use the ES policy unique to a small cell. If a small cell is not installed in the coverage of another cell, that is, if a small cell has no coverage cell, the small cell configures to use no ES policy unique to a small cell. Or, a small cell may configure to use the conventional ES policy.

(2-2) If a small cell is installed in the coverage of a macro cell, that is, if a small cell has a coverage macro cell, the small cell configures to use the ES policy unique to a small cell. If a small cell is not installed in the coverage of a macro cell, that is, if a small cell has no coverage macro cell, the small cell configures to use no ES policy unique to a small cell. For example, a small cell may use the conventional ES policy.

(3) As in the first embodiment, the already installed network equipment configures whether to use the ES policy unique to a small cell. The network equipment performs a configuration using the configuration parameter suitable for the capability of the small cell, which is notified from the network equipment to the small cell when a small cell is installed. Specifically, the network equipment performs a configuration using the energy saving (ES) policy being a configuration parameter. If there is no energy saving (ES) policy being a configuration parameter, a configuration may be made such that the ES policy unique to a small cell is not used. Or, if there is no ES policy being a configuration parameter, a configuration may be made such that the conventional ES policy is used. The already installed network equipment may judge whether to use the ES policy unique to a small cell. Specific examples of the already installed network equipment include an ES concentrator in addition to the specific examples of the first embodiment. If the entity that judges whether to use the ES policy unique to a small cell differs from the entity that configures whether to use the ES policy unique to a small cell, the judgment entity may notify the configuration entity of the information as to whether to use the ES policy unique to a small cell. The small cell may judge whether to use the ES policy unique to a small cell on the basis of the configuration parameter notified from the network equipment being a configuration entity.

Disclosed below are specific examples of the method in which another cell (such as a coverage cell, a coverage macro cell, or a neighbor cell), which notifies a small cell that it is to "permit switch-off" or "prohibit switch-off," recognizes whether a target cell uses the ES policy unique to a small cell, per specific example of the method of configuring an ES policy.

The following two, (1-1) and (1-2), will be disclosed as specific examples of the case where the method of configuring an ES policy (1) is used.

(1-1) A small cell broadcasts that it is a small cell. Another cell receives the broadcast information of a target cell to check whether it is a small cell.

(1-2) When a small cell is installed using the first embodiment, judgment is made on the basis of the capability parameter of the small cell, which is notified from the small cell. When the capability parameter includes an indication that a target cell is a small cell, the target cell is judged to be a small cell. Alternatively, the cell that has notified its own capability parameter may be judged to be a small cell.

The following (2-1) will be disclosed as a specific example of the case where the method of configuring an ES policy (2) is used.

(2-1) The specific example (4) of the operation of the small cell when it receives a configuration parameter from network equipment, disclosed in the first embodiment, is used.

The following two, (3-1) and (3-2), will be disclosed as specific examples of the case where the method of configuring an ES policy (3) is used.

(3-1) As in (2-1) above, the specific example (4) of the operation of a small cell when it receives a configuration parameter from network equipment, disclosed in the first embodiment, is used.

(3-2) The network equipment that configures, for a small cell, whether to use the ES policy unique to a small cell notifies another cell of the configuration as to whether to use the ES policy unique to a small cell of the small cell.

The following four, (1) and (4), will be disclosed as specific examples of the interface used in notification of an instruction to permit or prohibit switch-off from another cell or a coverage macro cell to a small cell.

(1) Notification is made in broadcast information. A new indicator is added. The specific example (1) excels the specific examples (2) and (3) of the interface described below in that an instruction to permit or prohibit switch-off needs not to be notified individually per small cell when, for example, a large number of small cells are installed in a cell. The following two, (1-1) and (1-2), will be disclosed as specific examples of the method of receiving the broadcast information of a small cell: (1-1) when broadcast information is received during neighbor cell search, and (1-2) when update notification of the system information of another cell or a coverage macro cell is received.

(2) Notification is made by an X2 interface. An indicator may be added to the existing message. The following three, (2-1) to (2-3), will be disclosed as specific examples of the existing message.

(2-1) "CELL ACTIVATION REQUEST" message (see Chapter 8.3.1 of Non-Patent Document 15), which is a message for requesting switch-on of a cell being switched off in the conventional ES policy. The ES-related information can be transmitted and received in the same message, avoiding a communication system becoming more complicated.

(2-2) "LOAD INFORMATION" message (see Chapter 9.1.2.1 of Non-Patent Document 15). As described below, when the status of radio resources is used in the judgment as to whether to permit or prohibit switch-off, the radio-resource-related information can be transmitted and received in the same message, avoiding a communication system becoming more complicated.

(2-3) "eNB Configuration Update" message (see Chapter 8.3.5 of Non-Patent Document 15). The cell configuration or status information can be transmitted and received in the same message, avoiding a communication system becoming more complicated.

(3) Notification is made by an S1 interface via an MME. An indicator may be added to the existing message. A specific example of the existing message will be disclosed below. "eNB Configuration Update" message (see Chapter 8.7.4 of Non-Patent Document 16). The cell configuration or status information can be transmitted and received in the same message, avoiding a communication system becoming more complicated.

(4) A new interface may be provided.

Disclosed below are specific examples of the judgment as to whether to permit or prohibit switch-off from another cell or a coverage macro cell to a small cell.

Another cell or a coverage macro cell prohibits switch-off if its own load is high. Thus, the small cell, which has been instructed to prohibit switch-off, does not switch itself off by its own judgment. The UE located in the coverage of the small cell can accordingly use the small cell, eliminating a lack of radio resources in another cell or a coverage macro cell. For the same reason, the processing load of another cell or a coverage macro cell can be reduced.

Another cell or a coverage macro cell permits switch-off when its own load is low. This causes the small cell that has received an instruction to permit switch-off to switch itself off by its own judgment. Thus, if the small cell switches itself off, another cell or a coverage macro cell can properly communicate with a UE being served by the small cell being switched off because the other cell or the coverage macro cell has a low load. Also, power saving is achieved by the small cell switching itself off.

Figure 19:
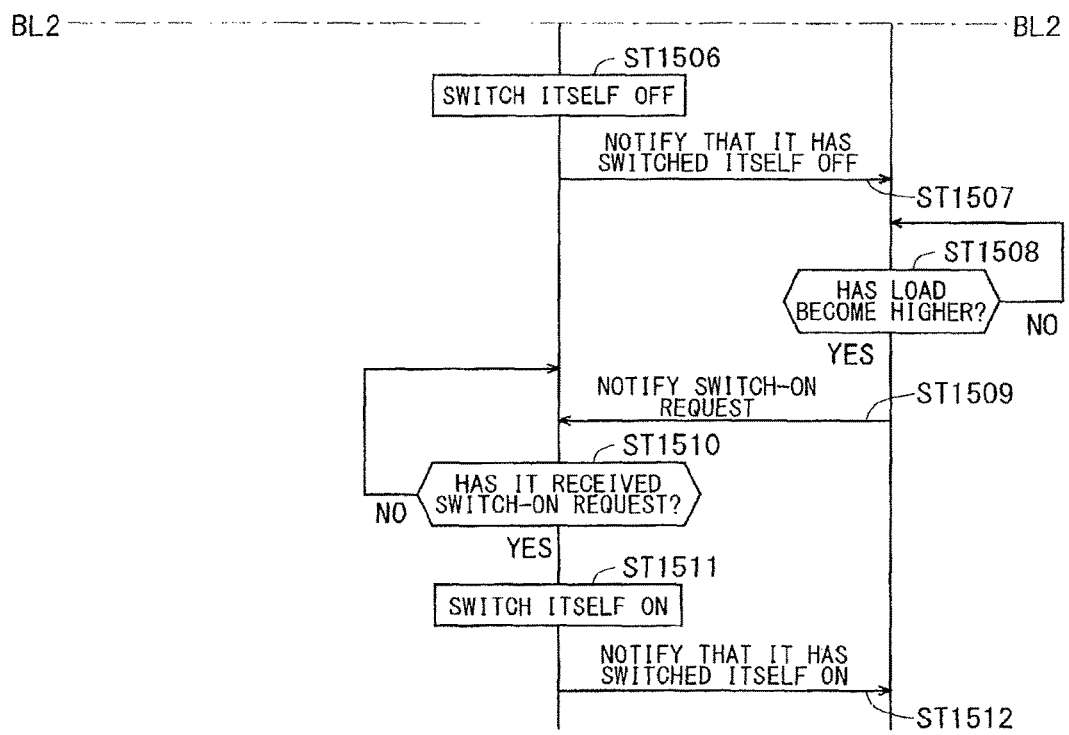
FIG. 19 shows the example sequence of the communication system in the second embodiment.

Next, a specific example of the sequence of a communication system in the case where the solution in the second embodiment is used will be described with reference to FIGS. 18 and 19. FIGS. 18 and 19 show an example sequence of the communication system in the second embodiment. FIG. 18 is continuous with FIG. 19 at a boundary BL2. Steps of FIGS. 18 and 19, corresponding to those of FIGS. 16 and 17, will be denoted by the same step numbers and common description will be omitted.

In Step ST1401, a small cell is installed. The small cell performs neighbor cell search in Step ST1402 and then moves to Step ST1403.

The small cell judges whether it is installed in the coverage of a macro cell in Step ST1403, thereby judging whether a coverage macro cell is present. If judging in Step ST1403 that it is not installed in the coverage of a macro cell, the small cell judges that no coverage macro cell is present and then moves to Step ST1500. If judging in Step ST1403 that it is installed in the coverage of a macro cell, the small cell judges that a coverage macro cell is present and then moves to Step ST1501.

In Step ST1500, the small cell determines to use the conventional ES policy. The small cell may determine not to use the ES policy unique to the small cell. Upon completion of the process of Step ST1500, the small cell ends the process in installation and then moves to another process. The processes after Step ST1500 are not characteristic of the present invention, which will not be described here.

In Step ST1501, the small cell determines to use the ES policy unique to the small cell.

In Step ST1502, the coverage macro cell maps an indicator to permit or prohibit switch-off of the small cell in the coverage to broadcast information, and then transmits the broadcast information after the mapping to the small cell.

In Step ST1503, the small cell receives the broadcast information. The small cell may receive the broadcast information of the coverage macro cell.

In Step ST1504, the small cell judges whether switch-off is permitted. In this example, the small cell judges whether the broadcast information received in Step ST1503 contains the indicator to permit switch-off, thereby judging whether switch-off is permitted.

If judging in Step ST1504 that the broadcast information contains the indicator to permit switch-off, the small cell judges that switch-off is permitted and then moves to Step ST1505. If judging in Step ST1504 that the broadcast information contains no indicator to permit switch-off, the small cell judges that switch-off is not permitted and then returns to Step ST1503.

In Step ST1505, the small cell judges whether to switch itself off by its own judgment. If judging in Step ST1505 to switch itself off, the small cell moves to Step ST1506 of FIG. 19. If judging in Step ST1505 not to switch itself off, the small cell returns to Step ST1503. Or, the small cell may repeat the process of Step ST1505.

In the example shown in FIGS. 18 and 19, the process of Step ST1505 is performed after the processes of Steps ST1503 and ST1504. Alternatively, the order of the processes may be changed such that the processes of Steps ST1503 and ST1504 are performed after the process of Step ST1505.

In Step ST1506, the small cell switches itself off. In Step ST1507, the small cell notifies the coverage macro cell that it has switched itself off.

In the example shown in FIGS. 18 and 19, the process of Step ST1507 is performed after the process of Step ST1506. Alternatively, the order of the processes may be changed such that the process of Step ST1506 is performed after the process of Step ST1507. In this case, the process of notifying the coverage macro cell that the small cell is to switch itself off may be performed as the process of Step ST1507.

In Step ST1508, the coverage macro cell judges whether the load has become higher. If judging in Step ST1508 that the load has become higher, the coverage macro cell moves to Step ST1509. If judging in Step ST1508 that the load has not become high, the coverage macro cell repeats the process of Step ST1508.

In Step ST1509, the coverage macro cell notifies the small cell of a switch-on request to request the small cell to switch itself on.

In Step ST1510, the small cell judges whether to have received the switch-on request from the coverage macro cell. If judging to have received the switch-on request in Step ST1510, the small cell moves to Step ST1511. If judging to have received no switch-on request in Step ST1510, the small cell returns to Step ST1509.

In Step ST1511, the small cell switches itself on. In Step ST1512, the small cell notifies the coverage macro cell that it has switched itself on.

In the example shown in FIGS. 18 and 19, the process of Step ST1512 is performed after the process of Step ST1511. Alternatively, the order of the processes may be changed such that the process of Step ST1511 is performed after the process of Step ST1512. In this case, the small cell may perform the process of notifying the coverage macro cell that it is to switch itself on as the process of Step ST1512.

Figure 20:
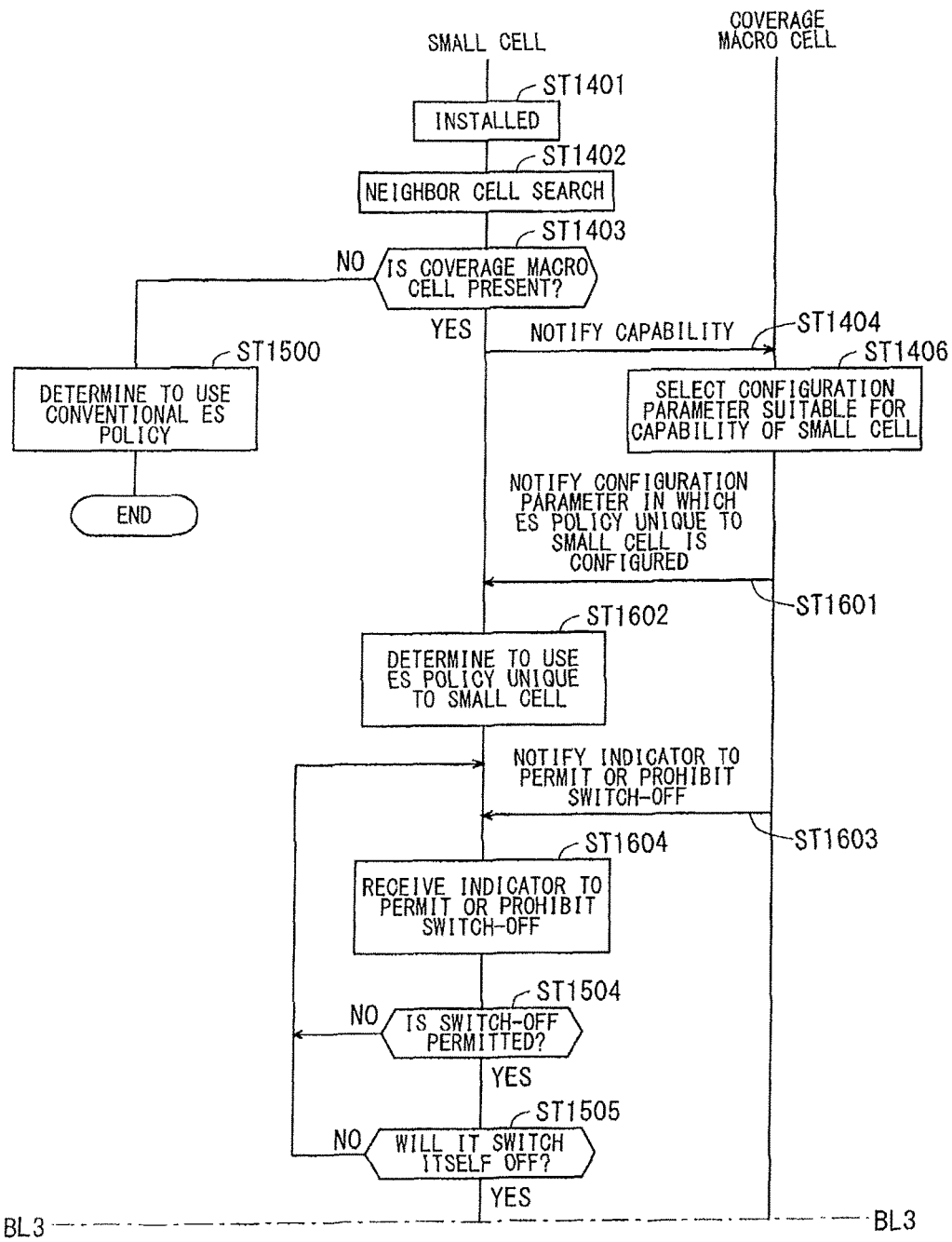
FIG. 20 shows another example sequence of the communication system in the second embodiment.
Figure 21:
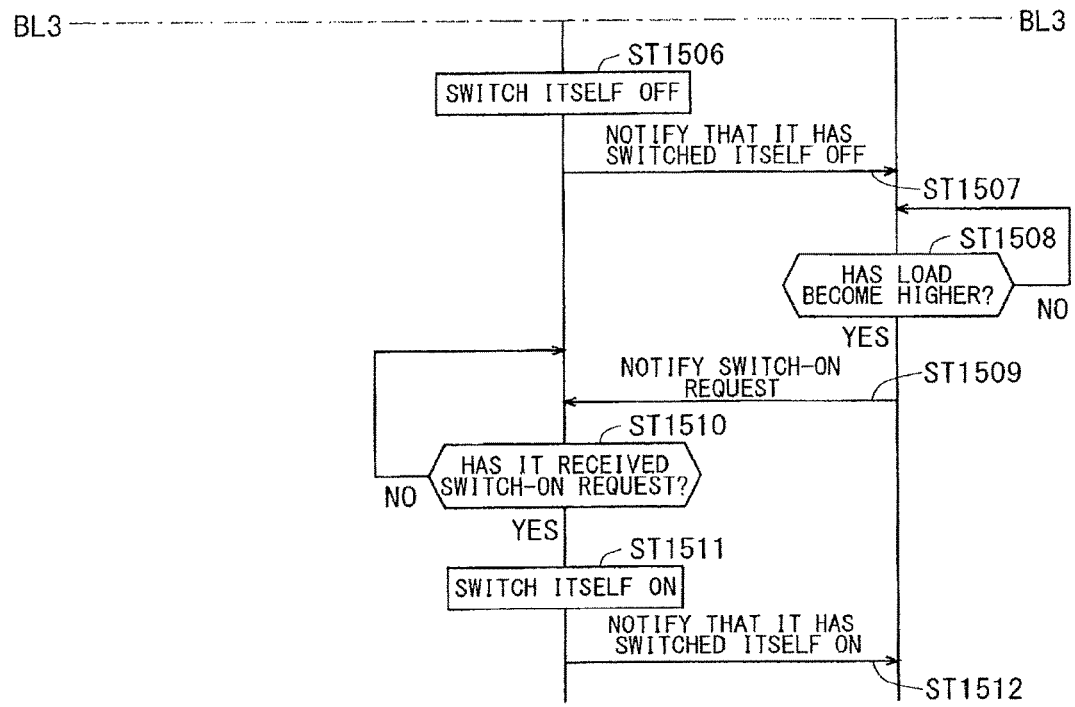
FIG. 21 shows the other example sequence of the communication system in the second embodiment.

Next, a specific example of another sequence of the communication system in the case where the solution of the second embodiment is used will be described with reference to FIGS. 20 and 21. FIGS. 20 and 21 show another example sequence of the communication system in the second embodiment. FIG. 20 is continuous with FIG. 21 at a boundary BL3. In the example shown in FIGS. 20 and 21, processes different from those of FIGS. 18 and 19 are performed. Steps of FIGS. 20 and 21, corresponding to those of FIGS. 16 to 19, will be denoted by the same step numbers and common description will be omitted.

In Step ST1401, a small cell is installed. The small cell performs neighbor cell search in Step ST1402 and then moves to Step ST1403.

If judging in Step ST1403 that it is not installed in the coverage of a macro cell, the small cell judges that no coverage macro cell is present and then moves to Step ST1500. If judging in Step ST1403 that it is installed in the coverage of a macro cell, the small cell judges that a coverage macro cell is present and then moves to Step ST1404. In Step ST1404, the small cell notifies the coverage macro cell of its own capability.

In Step ST1406, the coverage macro cell, which has received the capability of the small cell in Step ST1404, selects a configuration suitable for the capability of the small cell. Specifically, the coverage macro cell selects a configuration parameter suitable for the capability of the small cell. In this example, the coverage macro cell selects the ES policy unique to the small cell as an ES policy and selects a configuration parameter in which the ES policy unique to the small cell is configured.

In Step ST1601, then, the coverage macro cell notifies the small cell of the configuration parameter selected in Step ST1406. In this example, the coverage macro cell notifies the small cell of the configuration parameter in which the ES policy unique to the small cell is configured as an ES policy.

In Step ST1602, the small cell determines to use the ES policy unique to the small cell in accordance with the configuration parameter received in Step ST1601.

In Step ST1603, the coverage macro cell notifies the small cell in its coverage of an indicator to permit or prohibit switch-off.

In Step ST1604, the small cell receives the indicator to permit or prohibit switch-off from the coverage macro cell. Upon receipt of the indicator to permit or prohibit switch-off, the small cell moves to Step ST1504.

In Step ST1504, the small cell judges whether switch-off is permitted. In this example, the small cell judges whether the indicator received in Step ST1604 is an indicator to permit switch-off, thereby judging whether switch-off is permitted.

If judging in Step ST1504 that the received indicator is an indicator to permit switch-off, the small cell judges that switch-off is permitted and then moves to Step ST1505. If judging in Step ST1504 that the received indicator is not an indicator to permit switch-off, that is, that the received indicator is an indicator to prohibit switch-off, the small cell judges that switch-off is not permitted and then returns to Step ST1603.

The small cell judges whether to switch itself off by its own judgment in Step ST1505 and, if, judging to switch itself off, moves to Step ST1506 of FIG. 21. If judging in Step ST1505 not to switch itself off, the small cell returns to Step ST1603. Or, the small cell may repeat the process of Step ST1505.

Then, in Steps ST1506 to ST1512, the processes similar to those of Steps ST1506 to ST1512 of FIG. 19 are performed.

The second embodiment achieves the following effects. An ES operation suitable for the small cell is achieved. Energy saving, which reflects the load, is achieved as a communication system. An ES operation of the small cell, corresponding to the installation place of the small cell, is achieved. In the installation of a small cell, the ES policy of the small cell can be configured without an operator. This achieves easy operation and administration by the operator when a small cell is installed.

First Modification of Second Embodiment

A first modification of the second embodiment solves a problem similar to that of the second embodiment. Described below is a solution in the first modification of the second embodiment.

The first modification of the second embodiment newly provides the ES method unique to a small cell, which differs from the conventional method. Specifically, a switch-off method unique to a small cell and a method of requesting re-activation unique to a small cell are newly provided in the conventional ES policy. These methods do not newly provide an ES policy per se and thus avoid a communication system becoming more complicated than the method of newly providing an ES policy unique to a small cell of the second embodiment. Also, a communication system having excellent backward compatibility can be constructed. This achieves an ES operation optimum for a communication system in which small cells are introduced.

The solution in the first modification of the second embodiment will be specifically described below. The following four, (1) to (4), will be disclosed as specific examples of the ES method unique to a small cell.

(1) As a specific example of the switch-off method unique to a small cell, a small cell makes an inquiry to another cell about whether it can switch itself off before switch-off. Another cell may be a concentrated control node for the small cell. Or, another cell may be an ES concentrated control node (also referred to as an "ES concentrator"). Or, if a small cell is installed in the coverage of another cell, the small cell may make an inquiry to the other cell about whether it can switch itself off.

If a response to the inquiry about whether it can switch itself off is switch-off permission, the small cell switches itself off.

If a response to the inquiry about whether it can switch itself off is switch-off prohibition, the small cell does not switch itself off. When notifying switch-off prohibition, another cell may also notify a prohibition period. The small cell does not switch itself off during the switch-off prohibition period.

The small cell located outside the coverage of another cell may operate as follows. The small cell can switch itself off by its own judgment. In switch-off, the small cell notifies a neighbor cell that it is to switch itself off. When requested to switch itself on from a neighbor cell, the small cell switches itself on.

(2) As a specific example of the switch-off method unique to a small cell, if a small cell is installed in the coverage of a macro cell, the small cell makes an inquiry to the coverage macro cell about whether it can switch itself off before switch-off.

If a response to the inquiry about whether it can switch itself off is switch-off permission, the small cell switches itself off.

If a response to the inquiry about whether it can switch itself off is switch-off prohibition, the small cell does not switch itself off. When notifying switch-off prohibition, the coverage macro cell may also notify a switch-off prohibition period. The small cell does not switch itself off during the switch-off prohibition period.

A small cell located outside the coverage of the macro cell operates as follows. The small cell can switch itself off by its own judgment. In switch-off, the small cell notifies a neighbor cell that it is to switch itself off. When requested to switch itself on from the neighbor cell, the small cell switches itself on.

(3) As a specific example of the method of requesting re-activation unique to a small cell, when notifying a small cell in a switch-off state of a switch-on request, a neighbor cell configures a switch-off prohibition period. In notifying a switch-on request to a cell that has notified that the cell is a small cell when notifying switch-off, the neighbor cell may configure a switch-off prohibition period. Or, the neighbor cell may be a concentrated control node for the small cell. Or, the neighbor cell may be an ES concentrated control node (also referred to as an "ES concentrator"). The small cell does not switch itself off during the switch-off prohibition period.

(4) As a specific example of the method of requesting re-activation unique to a small cell, when notifying a small cell in a switch-off state of a switch-on request, a coverage macro cell configures a switch-off prohibition period. In notifying a switch-on request to a cell that has notified that the cell is a small cell when notifying switch-off, the coverage macro cell may configure a switch-off prohibition period. The small cell does not switch itself off during the switch-off prohibition period.

As described above, Non-Patent Document 1 discloses that an OAM configures a switch-off determining policy used by an eNB but does not disclose details thereof. In other words, Non-Patent Document 1 does not disclose that another cell is inquired about whether switch-off is enabled before switch-off. As described above, Non-Patent Document 1 discloses that an OAM configures a re-activation request policy used by a neighbor eNB but does not disclose details thereof. In other words, Non-Patent Document 1 also does not disclose a switch-off prohibition period.

Specific examples of the method of judging whether a small cell is installed in the coverage of another cell or a macro cell are similar to those of the first embodiment, which will not be described here.

Specific examples of the method in which a small cell judges whether a target cell is a macro cell in cell search are similar to those of the first embodiment, which will not be described here.

The following two, (1-1) and (1-2), will be disclosed as specific examples of the operation in the case where a plurality of other cells are present in the specific example (1) of the ES method unique to a small cell.

(1-1) A small cell follows the instructions of all the other cells. Specifically, the small cell makes inquiries to all the other cells. The small cell, which has been instructed to permit switch-off from all the other cells, operates as follows. The small cell can switch itself off by its own judgment. In switch-off, the small cell notifies a neighbor cell that it is to switch itself off. When requested to switch itself on from a neighbor cell, the small cell switches itself on.

The small cell, which has been instructed to prohibit switch-off from at least another cell, operates as follows. The small cell cannot switch itself off by its own judgment. Specifically, the small cell does not switch itself off.

(1-2) A small cell follows the instruction of the representative other cell among a plurality of other cells. Specifically, the small cell determines the representative other cell.

More specifically, the small cell makes an inquiry to the representative other cell. The small cell, which has been instructed to permit switch-off from the representative other cell, operates as follows. The small cell can switch itself off by its own judgment. In switch-off, the small cell notifies the representative other cell or a neighbor cell that it is to switch itself off. When requested to switch itself on from the representative other cell or the neighbor cell, the small cell switches itself on.

The small cell, which has been instructed to prohibit switch-off from the representative other cell, operates as follows. The small cell cannot switch itself off by its own judgment. In other words, the small cell does not switch itself off.

The following two, (1-2-1) and (1-2-2), will be disclosed as specific examples of the method of determining the representative other cell.

(1-2-1) A coverage cell having the highest reception quality in cell search by a small cell is the representative other cell.

(1-2-2) A coverage cell that has performed a configuration suitable for the capability of a small cell using the first embodiment is the representative other cell.

The following two, (2-1) and (2-2), will be disclosed as specific examples of the operation when a plurality of coverage macro cells are present in the specific example (2) of the ES method unique to a small cell.

(2-1) A small cell follows the instructions of all the coverage macro cells.

Specifically, the small cell makes inquiries to all the coverage macro cells. The small cell, which has been instructed to permit switch-off from all the coverage macro cells, operates as follows. The small cell can switch itself off by its own judgment. In switch-off, the small cell notifies all the coverage macro cells that it is to switch itself off. When requested to switch itself on from the coverage macro cell, the small cell switches itself on.

The small cell, which has been instructed to prohibit switch-off from at least one coverage macro cell, operates as follows. The small cell cannot switch itself off by its own judgment. In other words, the small cell does not switch itself off.

(2-2) A small cell follows the instruction of a representative coverage macro cell among a plurality of coverage macro cells. Specifically, the small cell determines a representative coverage macro cell.

More specifically, the small cell makes an inquiry to a representative coverage cell. The small cell, which has been instructed to permit switch-off from the representative coverage macro cell, operates as follows. The small cell can switch itself off by its own judgment. In switch-off, the small cell notifies a representative coverage macro cell or a coverage macro cell that it is to switch itself off. When requested to switch itself on from the representative coverage macro cell or the coverage macro cell, the small cell switches itself on.

The small cell, which has been instructed to prohibit switch-off from the representative coverage macro cell, operates as follows. The small cell cannot switch itself off by its own judgment. In other words, the small cell does not switch itself off.

The following three, (2-2-1) to (2-2-3), will be disclosed as specific examples of the method of determining a representative coverage macro cell.

(2-2-1) A coverage macro cell having the highest reception quality in cell search by a small cell is a representative coverage macro cell.

(2-2-2) A coverage macro cell that has performed a configuration suitable for the capability of a small cell using the first embodiment is a representative coverage macro cell.

(2-2-3) A macro cell to be operated together with a small cell in the macro support mode is a representative coverage macro cell. Specific examples of the macro cell to be operated together with a small cell are similar to those of the first embodiment, which will not be described here.

The following two, (3-1) and (3-2), will be disclosed as specific examples of the operation when a plurality of other cells are present in the specific example (3) of the ES method unique to a small cell.

(3-1) A small cell follows the instructions of all the other cells.

Specifically, the small cell follows the longest switch-off prohibition period among the switch-off prohibition periods notified from all the other cells. The small cell cannot switch itself off by its own judgment during the switch-off prohibition period. In other words, the small cell does not switch itself off.

(3-2) A small cell follows the instruction of the representative other cell among a plurality of other cells. Specifically, the small cell determines the representative other cell.

More specifically, the small cell follows a switch-off prohibition period notified from the representative other cell. The small cell cannot switch itself off by its own judgment during the switch-off prohibition period notified from the representative other cell. In other words, the small cell does not switch itself off.

Specific examples of the method of determining the representative other cell are similar to the specific examples of the method of determining the representative other cell in (1-2) of the specific example (1) of the ES method unique to a small cell, which will not be described here.

The following two, (4-1) and (4-2), will be disclosed as specific examples of the operation when a plurality of coverage macro cells are present in the specific example (4) of the ES method unique to a small cell.

(4-1) A small cell follows the instructions of all the coverage macro cells.

Specifically, the small cell follows the longest switch-off prohibition period among the switch-off prohibition periods notified from all the coverage macro cells.

The small cell cannot switch itself off by its own judgment during the switch-off prohibition period. In other words, the small cell does not switch itself off.

(4-2) A small cell follows the instruction of a representative coverage macro cell among a plurality of coverage macro cells. Specifically, the small cell determines a representative coverage macro cell.

More specifically, the small cell follows a switch-off prohibition period notified from the representative coverage macro cell. The small cell cannot switch itself off by its own judgment during the switch-off prohibition period notified from the representative coverage macro cell.

Specific examples of the method of determining a representative coverage macro cell are similar to the specific examples of the method of determining a representative coverage macro cell in (2-2) of the specific example (2) of the ES method unique to a small cell, which will not be described here.

The following three, (1) to (3), will be disclosed as specific examples of the method in which another cell or a coverage macro cell judges whether a cell being switched off is a small cell.

(1) A cell broadcasts an indicator as to whether it is a small cell. Another cell or a coverage macro cell receives broadcast information of a target cell and checks an indicator as to whether the target cell is a small cell.

(2) Another cell or a coverage macro cell makes judgment on the basis of a capability parameter of a small cell, which is notified from the small cell when the small cell is installed using the first embodiment. If the capability parameter includes an indication that a target cell is a small cell, the other cell or the coverage macro cell judges that the target cell is a small cell. Or, the other cell or the coverage macro cell may judge a cell, which has notified its own capability parameter, as a small cell. The cell may also notify its own identifier. Or, the cell may also notify an indicator as to whether the cell is a small cell when notifying a neighbor cell that the cell is to switch itself off.

(3) Another cell or a coverage macro cell judges a cell, which has made an inquiry about whether it can switch itself off before switch-off using the specific examples (1) and (2) of the ES method unique to a small cell, as a small cell. The cell may also notify its own identifier.

Specific examples of the entity that configures whether to use the ES method unique to a small cell and of the method of judging whether to use the ES method unique to a small cell in the small cell are similar to the specific examples of the entity that configures whether to use the ES policy unique to a small cell and of the method of judging whether to use the ES policy unique to a small cell in the small cell in the second embodiment, which will not be described here.

The following three, (1) to (3), will be disclosed as specific examples of the interface used by a small cell to notify another cell or a coverage macro cell whether the small cell can switch itself off before switch-off.

(1) Notification is made by an X2 interface. An indicator may be added to the existing message. Disclosed below as a specific example of the existing message is the "eNB Configuration Update" message (see Chapter 8.3.5 of Non-Patent Document 15). This is a message used when a cell notifies a neighbor cell that it is to switch itself off by its own judgment in the case of switching-off by the existing ES method. The ES-related information can accordingly be transmitted and received in the same message, avoiding a communication system becoming more complicated.

(2) Notification is made by an S1 interface via an MME. An indicator may be added to the existing message. Disclosed below as a specific example of the existing message is the "eNB Configuration Update" message (see Chapter 8.7.4 of Non-Patent Document 16). The cell configuration or status information can be transmitted and received in the same message, avoiding a communication system becoming more complicated.

(3) A new interface may be provided.

The following three, (1) to (3), will be disclosed as specific examples of the interface used when another cell or a coverage macro cell notifies a small cell of a switch-off prohibition period.

(1) Notification is made in broadcast information. A new indicator is added. The specific example (1) excels the specific examples (2) and (3) of the interface described below in that a switch-off prohibition period needs not to be individually notified per small cell when, for example, a large number of small cells are installed in a cell. The following three, (1-1) to (1-3), will be disclosed as specific examples of the method of receiving broadcast information in a small cell: (1-1) when broadcast information is received in neighbor cell search, (1-2) when update notification of system information of another cell or a coverage macro cell is received, and (1-3) a small cell, which has received a switch-on request from another cell or a coverage macro cell, receives broadcast information of the other cell or the coverage macro cell and checks a switch-off prohibition period.

(2) Notification is made by an X2 interface. An indicator may be added to the existing message. The following three, (2-1) to (2-3), will be disclosed as specific examples of the existing message.

(2-1) "CELL ACTIVATION REQUEST" message (see Chapter 8.3.1 of Non-Patent Document 15), which is a message of requesting a cell being switched off to switch itself on in the conventional ES operation. The ES-related information can be transmitted and received in the same message, avoiding a communication system becoming more complicated.

(2-2) "LOAD INFORMATION" message (see Chapter 9.1.2.1 of Non-Patent Document 15). When the status of radio resources is used for judgment in the case of permitting or prohibiting switch-off, as described below, the radio-resource-related information can be transmitted and received in the same message, avoiding a communication system becoming more complicated.

(2-3) "eNB Configuration Update" message (see Chapter 8.3.5 of Non-Patent Document 15). The cell configuration or status information can be transmitted and received in the same message, avoiding a communication system becoming more complicated.

(3) Notification is made by an S1 interface via an MME. An indicator may be added to the existing message. Disclosed below as a specific example of the existing message is the "eNB Configuration Update" message (see Chapter 8.7.4 of Non-Patent Document 16). The cell configuration or status information can be transmitted and received in the same message, avoiding a communication system becoming more complicated.

(4) A new interface may be provided.

The following two, (1) and (2), will be disclosed as specific examples of how a switch-off prohibition period is defined.

(1) A period after switch-on of a small cell, that is, a relative time.

(2) A period of switch-off prohibition, such as a period from 9 a.m. to 5 p.m., that is, an absolute time.

Described below is a specific example of the judgment as to whether another cell or a coverage macro cell configures a switch-off prohibition period for a small cell.

Another cell or a coverage macro cell judges, for higher load thereof, to configure a switch-off prohibition period. As a result, a small cell is not to switch itself off by its own judgment during a switch-off prohibition period. This allows a UE located in the coverage of the small cell to use the small cell, eliminating a lack of radio resources in the other cell or the coverage macro cell. Besides, for the same reason, the processing load of the other cell or the coverage macro cell can be reduced.

Another cell or a coverage macro cell judges, for a lower load thereof, not to configure a switch-off prohibition period. As a result, a small cell switches itself off by its own judgment. Thus, the other cell or the coverage macro cell has a low load, enabling the other cell or the coverage macro cell to properly communicate with a UE being served by the small cell if the small cell switches itself off. Also, the small cell, which switches itself off, can save energy.

Figure 22:
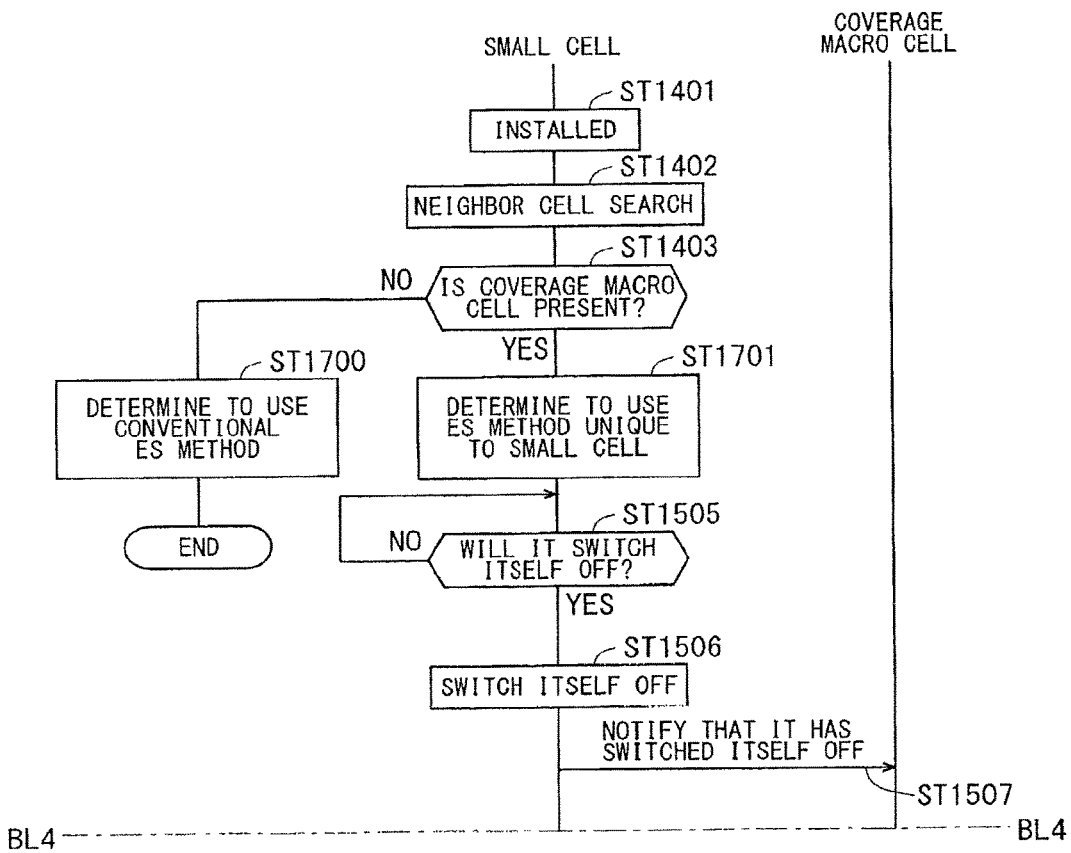
FIG. 22 shows an example sequence of a communication system in a first modification of the second embodiment.
Figure 23:
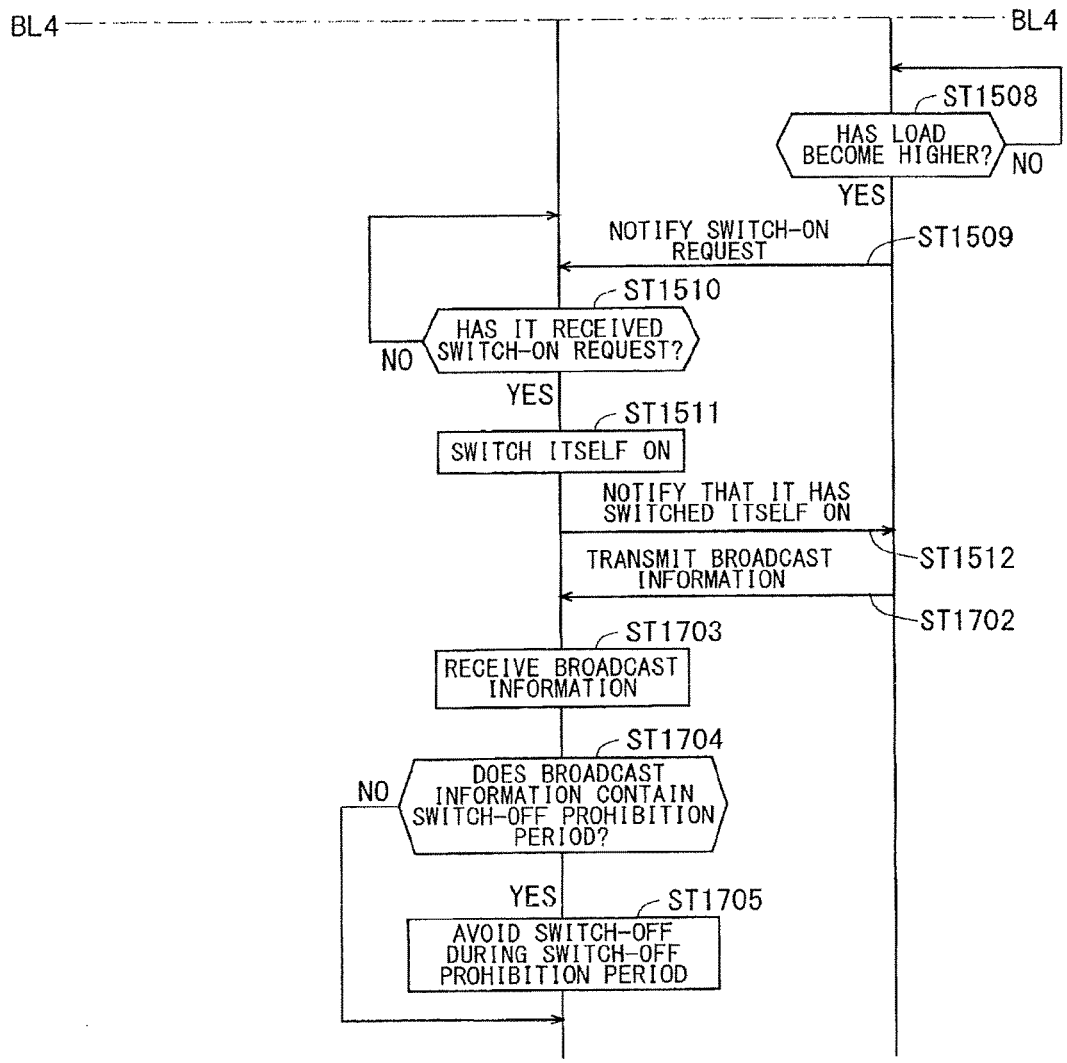
FIG. 23 shows the example sequence of the communication system in the first modification of the second embodiment.

Next, a specific example of the sequence of a communication system when the solution in the first modification of the second embodiment is used will be described with reference to FIGS. 22 and 23. FIGS. 22 and 23 show an example sequence of the communication system in the first modification of the second embodiment. FIG. 22 is continuous with FIG. 23 at a boundary BL4. Steps of FIGS. 22 and 23, corresponding to those of FIGS. 16 to 19, will be denoted by the same step numbers and common description will be omitted.

In Step ST1401, a small cell is installed. The small cell performs neighbor cell search in Step ST1402 and then moves to Step ST1403.

In Step ST1403, the small cell judges whether it is installed in the coverage of a macro cell, thereby judging whether a coverage macro cell is present. If judging in Step ST1403 that it is not installed in the coverage of a macro cell, the small cell judges that no coverage macro cell is present and then moves to Step ST1700. If judging in Step ST1403 that it is installed in the coverage of a macro cell, the small cell judges that a coverage macro cell is present and then moves to Step ST1701.

In Step ST1700, the small cell determines to use the conventional ES method. The small cell may determine not to use the ES method unique to the small cell. Upon completion of the process of Step ST1700, the small cell ends the process in installation and then moves to another process. The process after Step ST1700 is not characteristic of the present invention, which will not be described here.

In Step ST1701, the small cell determines to use the ES method unique to the small cell. When determining to use the ES method unique to a small cell, the small cell moves to Step ST1505.

In Step ST1505, the small cell judges whether to switch itself off by its own judgment. If judging to switch itself off in Step ST1505, the small cell moves to Step ST1506. If judging not to switch itself off in Step ST1505, the small cell repeats the process of Step ST1505.

Then, in Steps ST1506 and ST1507 of FIG. 22 and Steps ST1508 to ST1512 of FIG. 23, the processes similar to those of Steps ST1506 to ST1512 of FIG. 19 are performed.

Then, in Step ST1702 of FIG. 23, the coverage macro cell maps the switch-off prohibition period of a small cell in the coverage to broadcast information and then transmits the broadcast information after the mapping to the small cell.

The small cell, which has switched itself on in Step ST1511, or the small cell, which has received a switch-on request from the coverage macro cell in Step ST1509, receives the broadcast information from the coverage macro cell in Step ST1703.

In Step ST1704, the small cell judges whether the broadcast information received in Step ST1703 contains a switch-off prohibition period. If judging in Step ST1704 that the broadcast information contains a switch-off prohibition period, the small cell moves to Step ST1705. If judging in Step ST1704 that the broadcast information contains no switch-off prohibition period, the small cell does not perform the process of Step ST1705.

In Step ST1705, the small cell does not switch itself off during the switch-off prohibition period.

Figure 24:
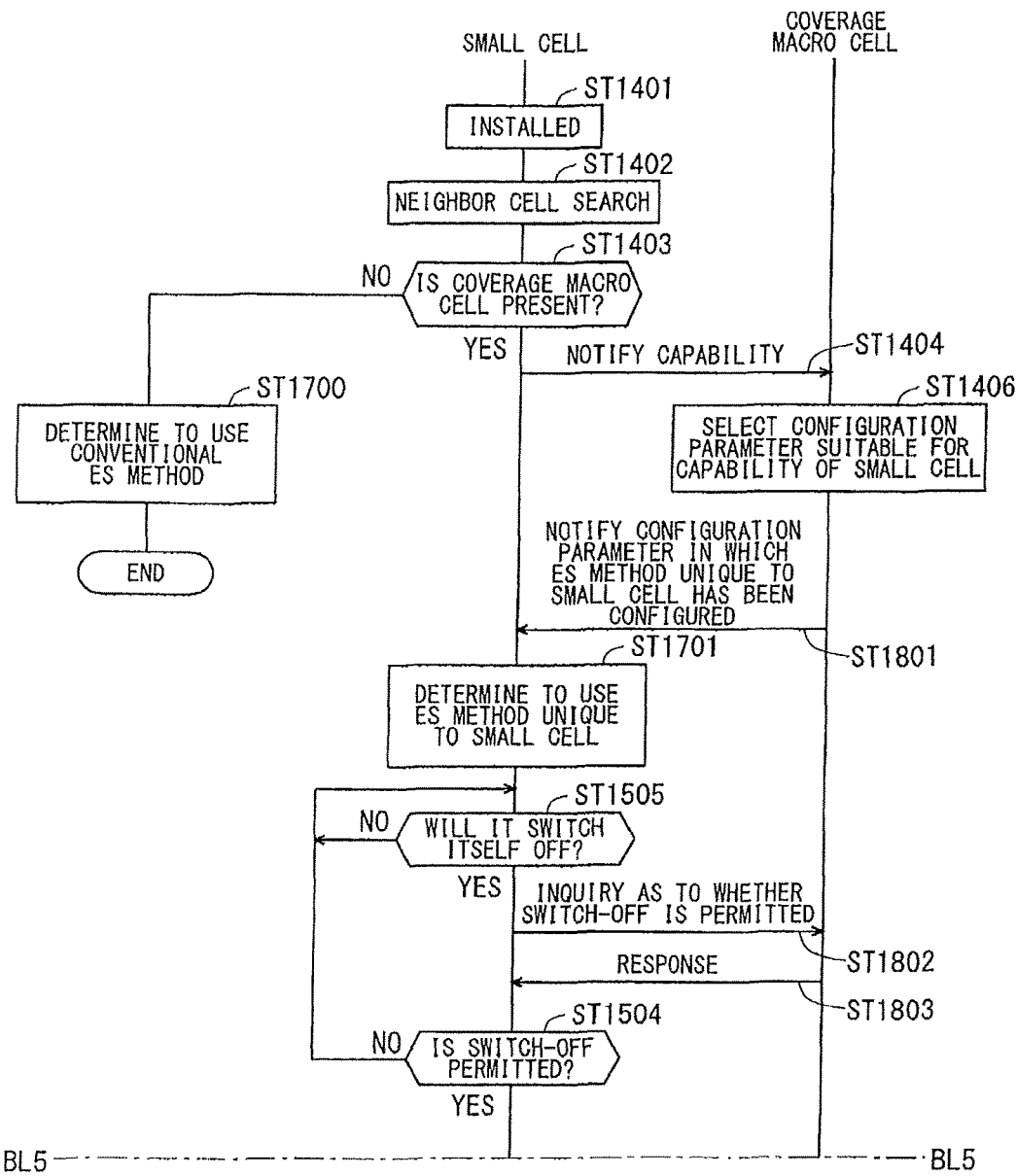
FIG. 24 shows another example sequence of the communication system in the first modification of the second embodiment.
Figure 25:
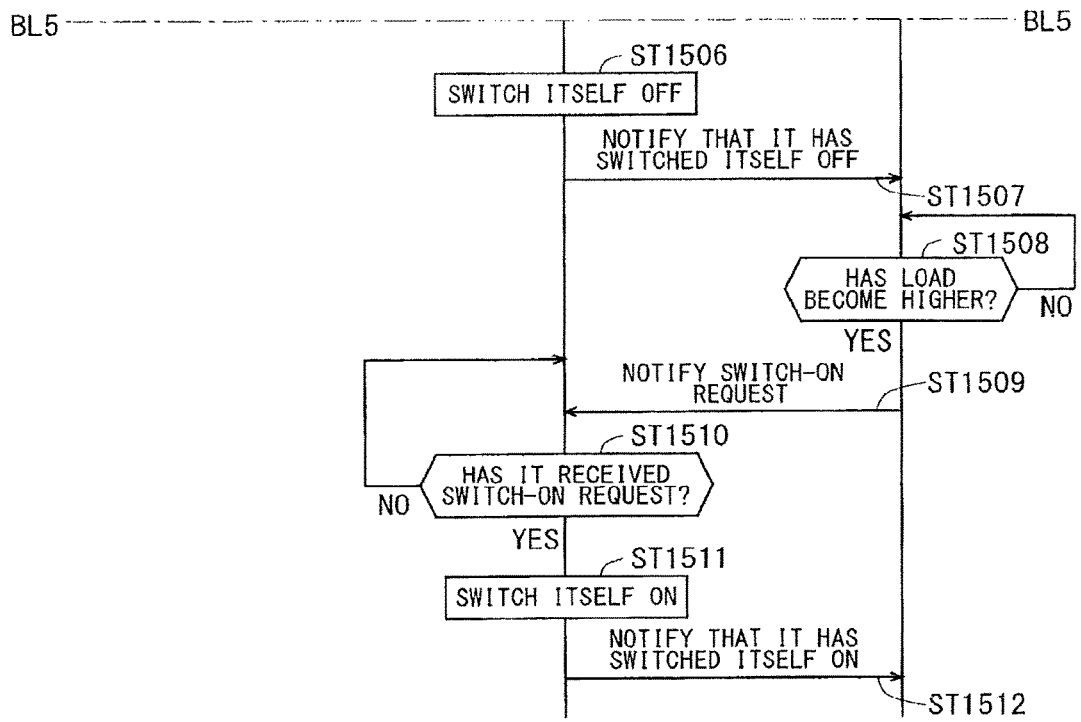
FIG. 25 shows the other example sequence of the communication system in the first modification of the second embodiment.

Next, a specific example of another sequence of the communication system when the solution in the first modification of the second embodiment is used will be described with reference to FIGS. 24 and 25. FIGS. 24 and 25 show another example sequence of the communication system in the first modification of the second embodiment. FIG. 24 is continuous with FIG. 25 at a boundary BL5. In the example shown in FIGS. 24 and 25, processes different from those of FIGS. 22 and 23 are performed. Steps of FIGS. 24 and 25, corresponding to those of FIGS. 16 to 19 and FIGS. 22 and 23, will be denoted by the same step numbers and common description will be omitted.

In Step ST1401, a small cell is installed. The small cell performs neighbor cell search in Step ST1402 and then moves to Step ST1403.

If judging in Step ST1403 that it is not installed in the coverage of a macro cell, the small cell judges that no coverage macro cell is present and then moves to Step ST1700. If judging in Step ST1403 that it is installed in the coverage of a macro cell, the small cell judges that a coverage macro cell is present and then moves to Step ST1404.

In Step ST1404, the small cell notifies the coverage macro cell of its own capability. In Step ST1406, the coverage macro cell that has received the capability of the small cell in Step ST1404 selects a configuration suitable for the capability of the small cell. Specifically, the coverage macro cell selects a configuration parameter suitable for the capability of the small cell. In this example, the coverage macro cell selects the ES method unique to the small cell as the ES method and selects a configuration parameter in which the ES method unique to the small cell has been configured.

In Step ST1801, then, the coverage macro cell notifies the small cell of the configuration parameter selected in Step ST1406. In this example, the coverage macro cell notifies the small cell of the configuration parameter in which the ES method unique to the small cell has been configured as the ES method.

In Step ST1701, next, the small cell determines to use the ES method unique to the small cell. When determining to use the ES method unique to the small cell, the small cell moves to Step ST1505.

In Step ST1505, the small cell judges whether to switch itself off by its own judgment. If judging to switch itself off in Step ST1505, the small cell moves to Step ST1802. If judging not to switch itself off in Step ST1505, the small cell repeats the process of Step ST1505.

In Step ST1802, the small cell makes an inquiry to the coverage macro cell about whether or not it can switch itself off.

In Step ST1803, the coverage macro cell notifies the small cell of a response to the inquiry about whether the small cell can switch itself off, which has been received in Step ST1802. The content of the response is switch-off permission or switch-off prohibition.

In Step ST1504, then, the small cell judges whether switch-off is permitted. In this example, the small cell judges whether or not the content of the response received in Step ST1803 is switch-off permission, thereby judging whether switch-off is permitted.

If judging in Step ST1504 that the content of the response received in Step ST1803 is switch-off permission, the small cell judges that switch-off is permitted and then moves to Step ST1506 of FIG. 25. If judging in Step ST1504 that the content of the response received in Step ST1803 is not switch-off permission, in other words, if judging that the content is switch-off prohibition, the small cell judges that switch-off is not permitted and then returns to Step ST1505.

Then, in Steps ST1506 to ST1512 of FIG. 25, processes similar to those of Steps ST1506 to ST1512 of FIG. 19 are performed.

The first modification of the second embodiment can achieve the effects similar to those of the second embodiment.

Second Modification of Second Embodiment

Described below is a problem solved in a second modification of the second embodiment. 3GPP has discussed a small cell cluster but has not discussed the ES operation in the case where a small cell cluster is introduced. It means that 3GPP has not discussed an ES operation optimum for the introduction of a small cell cluster.

Described below is a solution in the second modification of the second embodiment. In addition to the second embodiment, this modification newly provides an ES policy suitable for a small cell cluster.

A specific example of the ES policy suitable for a small cell cluster is the ES operation per small cell cluster.

The entity that controls the ES operation per small cell cluster is referred to as a "small cell cluster ES concentrator."

Specific examples of the small cell cluster are the same as those of the first embodiment, which will not be described here.

The following three, (1) to (3), will be disclosed as specific examples of the ES operation per small cell cluster.

(1) A small cell cluster ES concentrator judges whether any one small cell in a small cell cluster is switched on. If any one small cell in the small cell cluster is switched on, the small cell cluster ES concentrator instructs all the small cells included in the cluster to switch themselves on and also instructs all the small cells included in the cluster to prohibit switch-off.

(2) A small cell cluster ES concentrator judges whether a UE in the connected state (CONNECTED) is located while being served by any one small cell of a small cell cluster. If a UE in the connected state (CONNECTED) is located while being served by any one small cell of the small cell cluster, the small cell cluster ES concentrator instructs all the small cells included in the cluster to switch themselves on and also instructs all the small cells included in the cluster to prohibit switch-off.

If no UE in the connected state (CONNECTED) is located while being served by all the cells in the small cell cluster, the small cell cluster ES concentrator instructs all the small cells included in the cluster to permit switch-off. Or, the small cell cluster ES concentrator may instruct all the small cells included in the cluster to switch themselves off.

(3) Combination of (1) and (2) above.

The following six, (1) to (6), will be disclosed as specific examples of the small cell cluster ES concentrator.

(1) Scheduling entity in cell aggregation.
(2) Coordinated control entity for CoMP (also referred to as a "CoMP concentrator").
(3) Operation administration and maintenance (OAM). The OAM may configure an ES policy. If the small cell cluster ES concentrator is the OAM, the entity that configures an ES policy is the same as the small cell cluster ES concentrator. This eliminates the need for exchanging, for example, the ES policy information of cells, avoiding a communication system becoming more complicated.
(4) Coverage macro cell.
(5) MME.
(6) HeNBGW.

The small cell cluster ES concentrator and the entity that manages the small cell cluster may be the same. The entity that manages a small cell cluster stores a list of small cells included in the small cell cluster, eliminating the need for exchanging information of a list of small cells included in the small cell cluster. This avoids a communication system becoming more complicated.

Specific examples of the entity that manages a small cell cluster are the same as those of the first modification of the first embodiment, which will not be described here.

The following two, (1) and (2), will be disclosed as specific examples of the method in which a small cell cluster ES concentrator recognizes "whether a UE in the connected state (CONNECTED) is located while being served by any one small cell of a small cell cluster."

(1) The small cell cluster ES concentrator is notified of the information about the connection between a UE and each cell being served by an MME, which is owned by the MME.

(2) Each small cell notifies a small cell cluster ES concentrator of information as to whether a UE in the connected state (CONNECTED) is present.

Disclosed below is a specific example of the method in which a small cell cluster ES concentrator recognizes "whether any one small cell in a small cell cluster is switched on." In the ES operation, when switching itself off, a small cell notifies a small cell cluster ES concentrator that it switches itself off. In switch-on, the small cell notifies the small cell cluster ES concentrator that it has switched itself on. In notifying switch-on or switch-off, the small cell may also notify an indicator as to whether it is a small cell. The cell may also notify its own identifier.

The second modification of the second embodiment achieves the following effects. An ES operation optimum for the introduction of a small cell cluster is achieved. If a small cell cluster is introduced, an ES operation is achieved per small cell cluster. Effects thereof will be described below by way of specific examples.

If a small cell cluster is a group of small cells whose scheduling entities are the same, the ES operations of small cells that may be used in cell aggregation can be made the same. This enables the selection of small cells used in cell aggregation without taking into account the ES operation of each small cell. Cell aggregation can therefore be controlled easily.

If a small cell cluster is a group of small cells according to their installation places, the ES operations of small cells, which are desired to be switched off or on on the same condition, can be made the same. The same condition means, for example, that small cells installed in a school are desired to be switched off when the school is closed.

If a small cell cluster is a group of small cells belonging to the same CoMP cooperating set, ES operations of small cells, which may be used in CoMP, can be made the same. This enables the selection of small cells used in CoMP without taking into account the ES operation of each small cell. CoMP can therefore be controlled easily.

Third Modification of Second Embodiment

Described below is a problem solved in a third modification of the second embodiment. Probably, a large number of small cells are installed. A small cell probably has a relatively narrow coverage area. Thus, considered here is a case where the policy of determining switch-off used by an eNB relates to, for example, a UE in the connected state (CONNECTED). When a UE in the connected state (CONNECTED) moves at a constant speed, small cells are probably switched more frequently than macro cells because of a difference in coverage area. Generally, a cell needs a preparation period from switch-off to switch-on in which the cell is available to a UE as usual, that is, the UE and the cell can transmit and receive data. Frequent switching leads to a lack of the preparation period, so that a moving UE cannot transmit and receive data continuously. Also, frequent switching actually needs control information and the like, so that ES effects may not be achieved.

The following two, (A) and (B), will be disclosed as the solutions in the third modification of the second embodiment.

(A) One small cell can belong to a plurality of small cell clusters, and an ES operation can be achieved per small cell cluster with the use of the second modification of the second embodiment. A specific example will be described with reference to FIG. 26. FIG. 26 is a diagram for explaining the concept in the solution of the third modification of the second embodiment. Small cells individually configure coverages 1901 to 1917 in a predetermined range. For easy understanding, FIG. 26 does not show each small cell and shows each small cell by its coverage. The following description will describe the respective small cells by references "1901" to "1917" indicating their coverages.

A cluster a includes small cells 1910, 1911, 1914, 1915, and 1916. A cluster b includes the small cells 1911 and 1916 and small cells 1907, 1908, 1912, 1913, and 1917. A cluster c includes the small cells 1907, 1910, and 1911 and small cells 1901, 1902, 1905, and 1906.

In a location 1919, a UE 1900 is in the connected state with the small cell 1911. The UE 1900 transmits and receives user data to and from the small cell 1911.

If a UE in the connected state (CONNECTED) is located in the small cell 1911, the small cells included in the cluster a, the cluster b, and the cluster c are switched on because the small cell 1911 is included in the cluster a, the cluster b, and the cluster c. The small cells included in the cluster a, the cluster b, and the cluster c are prohibited from switching themselves off.

Described below is the case where the UE 1900 moves from the location 1919 to a location 1918.

In the location 1918, the UE 1900 is in the connected state with the small cell 1907. The UE 1900 transmits and receives user data to and from the small cell 1907.

If the UE in the connected state (CONNECTED) is located in the small cell 1907, the small cells included in the cluster b and the cluster c are switched on because the small cell 1907 is included in the cluster b and the cluster c. The small cells included in the cluster b and the cluster c are prohibited from switching themselves off.

The above reveals that the small cell 1907 that handles the transmission and reception by the UE 1900 after the UE moves is switched on while the UE 1900 is located in the location 1919 and the small cell 1911 is handling the transmission and reception by the UE 1900. As described above, the small cell is switched on before the UE moves, securing a preparation period, which enables continuous transmission and reception by a moving UE.

Considered here is a case where the UE 1900 moves from the location 1919 to the location 1918, and then slightly moves back to the location 1919. It is revealed that the small cell 1911 is switched on while the UE 1900 is located in the location 1918 and the small cell 1907 is handling the transmission and reception by the UE 1900. If the UE slightly moves back, the small cell where the UE was present before moving is not switched off immediately. Thus, a preparation period is secured, enabling continuous transmission and reception by a moving UE. The small cell where the UE was present before moving is not immediately switched off merely as a result of the UE moving, preventing frequent switching.

In the specific example (A), small cells included in a small cell cluster can be determined statically or semi-statically. Compared with the specific example (B), thus, the entity that notifies switch-off prohibition or switch-off permission can easily judge a notification destination, leading to a reduced processing load.

(B) An ES policy suitable for a small cell cluster is newly provided. The following two, (1) and (2), will be disclosed as specific examples of the ES policy suitable for a small cell cluster.

(1) A neighbor small cell for the small cell in which a UE in the connected state (CONNECTED) is located is switched on. A neighbor small cell for the small cell in which a UE in the connected state (CONNECTED) is located is prohibited from switching itself off.

Or, a neighbor small cell for the small cell in which a UE that transmits and receives a user data plane (U plane) is located is switched on. A neighbor small cell for the small cell in which a UE that transmits and receives a user data plane (U plane) is prohibited from switching itself off.

(2) A neighbor small cell for the small cell in which a UE in the connected state (CONNECTED) is not located is permitted to switch itself off.

Alternatively, a neighbor small cell for the small cell in which a UE that transmits and receives a user data plane (U plane) is not located is permitted to switch off.

In the location 1919 shown in FIG. 26, the UE 1900 is in the connected state with the small cell 1911. Or, the UE 1900 transmits and receives user data to and from the small cell 1911.

Neighbor small cells for the small cell 1911 in which a UE in the connected state (CONNECTED) is located, for example, the small cells 1906, 1907, 1910, 1912, 1915, and 1916 are switched on. Neighbor small cells for the small cell 1911 in which the UE in the connected state (CONNECTED) is located, for example, the small cells 1906, 1907, 1910, 1912, 1915, and 1916 are prohibited from switching themselves off.

Described below is the case where the UE 1900 moves from the location 1919 to the location 1918.

In the location 1918, the UE 1900 is in the connected state with the small cell 1907. Or, the UE 1900 transmits and receives user data to and from the small cell 1907.

Neighbor small cells for the small cell 1907 in which the UE in the connected state (CONNECTED) is located, for example, the small cells 1902, 1903, 1906, 1908, 1911, and 1912 are switched on. Neighbor small cells for the small cell 1911 in which the UE in the connected state (CONNECTED) is located, for example, the small cells 1902, 1903, 1906, 1908, 1911, and 1912 are prohibited from switching themselves off.

As described above, it is revealed that the small cell 1907 that handles the transmission and reception by the UE 1900 after the UE 1900 moves is switched on while the UE 1900 is located in the location 1919 and the small cell 1911 is handling the transmission and reception by the UE 1900. The small cell is switched on before the UE moves as described above, securing a preparation period, which enables continuous transmission and reception by a moving UE.

Considered here is a case where the UE 1900 moves from the location 1919 to the location 1918 and then slightly moves back to the location 1919. It is revealed that the small cell 1911 is switched on while the UE 1900 is located in the location 1918 and the small cell 1907 is handling the transmission and reception by the UE 1900. If the UE slightly moves back, the small cell where the UE was present before moving is not switched off immediately. This secures a preparation period, enabling continuous transmission and reception by a moving UE. Also, a small cell where the UE was present before moving is not switched off immediately merely as a result of the UE moving, preventing frequent switching.

The following four, (1) to (4), will be disclosed as specific examples of the entity that notifies each small cell of switch-on, switch-off prohibition, or switch-off permission.

(1) MME, which can make judgment easily because it holds information about the connection between a UE and each cell being served by an MME.

(2) Small cell in which a UE in the connected state (CONNECTED) is located, which can make judgment easily because it holds its connection information.

(3) Coverage macro cell.

(4) ES concentrated control node (ES concentrator).

The following three, (1) to (3), will be disclosed as specific examples of the interface used in notification of switch-on, switch-off prohibition or switch-off permission.

(1) Notification is made by an X2 interface. An indicator may be added to the existing message. The following three, (2-1) to (2-3), will be disclosed as specific examples of the existing message.

(1-1) "CELL ACTIVATION REQUEST" message (see Chapter 8.3.1 of Non-Patent Document 15), which is a message requiring a cell being switched off to switch itself on in the conventional ES policy. The ES-related information can be transmitted and received in the same message, avoiding a communication system becoming more complicated.

(1-2) "LOAD INFORMATION" message (see Chapter 9.1.2.1 of Non-Patent Document 15). Whether a UE in the connected state (CONNECTED) is present also means whether a radio resource is allocated to the UE, enabling the transmission and reception of the radio-resource-related information in the same message. This avoids a communication system becoming more complicated.

(1-3) "eNB Configuration Update" message (see Chapter 8.3.5 of Non-Patent Document 15). The cell configuration or status information can be transmitted and received in the same message, avoiding a communication system becoming more complicated.

(2) Notification is made by an S1 interface. An indicator may be added to the existing message. A specific example of the existing message will be disclosed below. "MME Configuration Update" message (see Chapter 8.7.5 of Non-Patent Document 16). No new message is provided, avoiding a communication system becoming more complicated.

(3) A new interface may be provided.

The third modification of the second embodiment achieves the following effects. When a UE moves between small cells, the small cell being a moving destination is switched on before the UE moves. This secures a preparation period, enabling continuous transmission and reception by a moving UE. Also, the small cell where the UE was present before moving is not immediately switched off merely as a result of the UE moving, preventing frequent switching because of a slight moving of the UE.

Third Embodiment

Described below is a problem solved in a third embodiment. The small cell probably has a relatively narrow coverage area. Considered here is a case where the policy of determining switch-off used by an eNB relates to, for example, a UE in the connected state (CONNECTED). The frequency at which a UE in the connected state (CONNECTED) is located while being served by a small cell is probably lower than by a macro cell. In other words, switching of small cells probably occurs more frequently than switching of macro cells.

The problem solved in the third embodiment will be described with reference to FIG. 15. For example, here, the UE1 is located in the coverage 1304 of the small cell 1305. The UE1 camps on the small cell 1305 (is in an idle state). In other words, the UE is not in the connected state. The small cell 1305 switches itself off by its own judgment because there is no UE in the connected state (CONNECTED).

The UE1 in the idle state performs cell reselection. The UE1 selects the macro cell 1303 having the coverage 1303 overlying the small cell 1305.

The UE1 reselects the macro cell 1303 and checks the TAC of the macro cell 1303.

If the TAC of the macro cell 1303 differs from the TAC of the small cell 1305, the UE1 processes TAU of the macro cell 1303.

There occurs a problem in which if no contrivance is made, TAU from the UE frequently occurs by small cells, which are probably installed in large numbers.

Described below is a solution in the third embodiment. The coverage macro cell and the small cell are to have the same TAC. Further, the small cells having the same coverage macro cell are to have the same TAC.

The following two, (1) and (2), will be disclosed as specific examples of the method of causing a coverage macro cell and a small cell to have the same TAC.

(1) As in the first embodiment, the already installed network equipment configures a TAC concomitantly with the configuration suitable for the capability of the small cell. The network equipment configures the same TAC as the TAC of the coverage macro cell.

(2) A small cell configures a TAC. The small cell performs cell search (neighbor cell search) when installed and, if a coverage macro cell is present, checks the TAC of the coverage macro cell and configures its own TAC to the checked TAC.

The following two, (1) and (2), will be disclosed as specific examples of the operation of the small cell that has configured a TAC.

(1) A small cell maps a TAC to broadcast information to notify UEs being served thereby of the TAC.

(2) A small cell reports the configured TAC to an MME.

When a coverage macro cell notifies a UE being served by a small cell of the system information of the small cell, the TAC of the small cell may be the same as the TAC of the coverage macro cell to be omitted. This reduces traffic.

The third embodiment achieves the following effects. In other words, if switching of small cells occurs more frequently than switching of macro cells or if a large number of small cells are installed, transmissions of a TAU from a UE can be reduced.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1301 and 1303, coverage of macro eNB (macro cell); 1302 and 1304, coverage of small eNB (small cell); 1305, 1306, and 1901 to 1917, small cell (coverage); and 1900, UE.

The invention claimed is:

1. A communication system comprising:
a communication terminal device including at least a controller and a wireless interface circuit to perform radio communication;
at least one base station device including a least a processor and a wireless interface circuit to configure a plurality of cells capable of radio communication with the communication terminal device; and
an entity including a processor coupled to at least one communication interface and configured to control the plurality of cells,
wherein each of the plurality of cells is configured to switch between a normal operation and an energy saving operation, the plurality of cells being grouped into a predetermined cell cluster according to an energy saving (ES) policy of each of the plurality of cells, and
the entity is configured to control switching between the normal operation and the energy saving operation of the plurality of cells.

2. The communication system according to claim 1, wherein the entity is configured to control switching between the normal operation and the energy saving operation per cell cluster.

3. The communication system according to claim 1, wherein the plurality of cells include a cell belonging a plurality of cell clusters.

4. A communication system comprising:
- a communication terminal device including at least a controller and a wireless interface circuit to perform radio communication;
- at least one base station device including a least a processor and a wireless interface circuit to configure a plurality of cells capable of radio communication with the communication terminal device; and
- an entity including a processor coupled to at least one communication interface and configured to control the plurality of cells,
- wherein each of the plurality of cells is configured to switch between a normal operation and an energy saving operation, the plurality of cells being grouped into a predetermined cell cluster according to an energy saving (ES) policy of each of the plurality of cells,
- the entity is configured to control a cell being a moving destination of the communication terminal device to shift to the normal operation before the communication terminal device moves into the cell, and
- the entity is configured to control switching between the normal operation and the energy saving operation per cell cluster.

* * * * *